(12) United States Patent
Jang et al.

(10) Patent No.: US 12,235,758 B2
(45) Date of Patent: Feb. 25, 2025

(54) ELECTRONIC DEVICE INCLUDING STORAGE AND METHOD OF PROCESSING DATA REQUEST USING MAPPING INFORMATION STORED IN NON-VOLATILE MEMORY LOADED INTO VOLATILE MEMORY

(71) Applicant: Samsung Electronics Co., Ltd., Suwon-si (KR)

(72) Inventors: Jintae Jang, Suwon-si (KR); Wonsuk Jung, Suwon-si (KR); Doohyun Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 20 days.

(21) Appl. No.: 17/704,796

(22) Filed: Mar. 25, 2022

(65) Prior Publication Data

US 2022/0308994 A1    Sep. 29, 2022

Related U.S. Application Data

(63) Continuation of application No. PCT/KR2022/003110, filed on Mar. 4, 2022.

(30) Foreign Application Priority Data

Mar. 24, 2021   (KR) .................. 10-2021-0037940

(51) Int. Cl.
  *G06F 12/06*  (2006.01)
  *G06F 9/451*  (2018.01)
  *G06F 12/02*  (2006.01)

(52) U.S. Cl.
  CPC .......... *G06F 12/0646* (2013.01); *G06F 9/451* (2018.02); *G06F 12/0253* (2013.01); *G06F 2212/251* (2013.01)

(58) Field of Classification Search
  None
  See application file for complete search history.

(56) References Cited

U.S. PATENT DOCUMENTS

| 9,542,324 B1* | 1/2017 | Wehman | ................ G06F 12/126 |
| 10,831,521 B2* | 11/2020 | Gupta | ................... G06F 16/182 |

(Continued)

FOREIGN PATENT DOCUMENTS

| KR | 10-0891333 B1 | 3/2009 |
| KR | 10-2015-0055884 A | 5/2015 |

(Continued)

OTHER PUBLICATIONS

International Search Report and written opinion dated Jun. 14, 2022, issued in International Application No. PCT/KR2022/003110.

*Primary Examiner* — Khoa D Doan
*Assistant Examiner* — Marwan Ayash
(74) *Attorney, Agent, or Firm* — Jefferson IP Law, LLP

(57) ABSTRACT

An electronic device is provided. The electronic device includes a processor, a volatile memory, and a storage. The processor is configured to, in response to a request for data included in a file, identify information of the file and a type of the request, configure a flag for the request if the file is determined to correspond to at least one in a list of a designated information table, identify, based on the flag, mapping information of a specific region, which includes a logical address of the data, in mapping information for mapping of logical addresses and physical addresses for the non-volatile memory of the storage, acquire, in response to the mapping information of the specific region existing in the volatile memory, a physical address of the non-volatile memory mapped to the logical address of the data, and transmit the request, including the acquired physical address of the non-volatile memory, to the storage.

19 Claims, 18 Drawing Sheets

(56) References Cited

U.S. PATENT DOCUMENTS

| | | |
|---|---|---|
| 2008/0256289 A1 | 10/2008 | Lee et al. |
| 2010/0191925 A1* | 7/2010 | Blount .................. H04L 67/568 |
| | | 711/E12.072 |
| 2013/0185488 A1* | 7/2013 | Talagala .............. G06F 12/0246 |
| | | 711/103 |
| 2014/0108721 A1 | 4/2014 | Byun |
| 2018/0314643 A1 | 11/2018 | Park |
| 2019/0057038 A1 | 2/2019 | Haswell |
| 2019/0317892 A1* | 10/2019 | Lee ....................... G06F 3/0679 |
| 2020/0192816 A1 | 6/2020 | Byun |
| 2020/0334167 A1* | 10/2020 | Byun .................. G06F 12/0246 |
| 2020/0394139 A1 | 12/2020 | Lee et al. |

FOREIGN PATENT DOCUMENTS

| | | |
|---|---|---|
| KR | 10-2019-0120573 A | 10/2019 |
| KR | 10-2053406 B1 | 12/2019 |
| KR | 10-2020-0033985 A | 3/2020 |
| KR | 10-2020-0073794 A | 6/2020 |
| KR | 10-2020-0123684 A | 10/2020 |
| KR | 10-2020-0143871 A | 12/2020 |
| KR | 10-2395538 B1 | 5/2022 |

* cited by examiner

ELECTRONIC DEVICE INCLUDING STORAGE AND METHOD OF PROCESSING DATA REQUEST USING MAPPING INFORMATION STORED IN NON-VOLATILE MEMORY LOADED INTO VOLATILE MEMORY

CROSS-REFERENCE TO RELATED APPLICATION(S)

This application is a continuation application, claiming priority under § 365 (c), of an International application No. PCT/KR2022/003110, filed on Mar. 4, 2022, which is based on and claims the benefit of a Korean patent application number 10-2021-0037940, filed on Mar. 24, 2021, in the Korean Intellectual Property Office, the disclosure of which is incorporated by reference herein in its entirety.

TECHNICAL FIELD

The disclosure relates to an electronic device including a storage and a method for using the storage.

BACKGROUND ART

An electronic device, such as a portable terminal, may include and use a storage to store a large amount of data. A flash memory includes a non-volatile memory and is widely used in portable terminals, computers, digital cameras, memory cards, and the like.

A flash memory may perform a garbage collection function to minimize a garbage area, and data may be moved by the function, so that mapping information (logical to physical (L2P) map table) of mapping a logical address and a physical address for a storage space in which data is stored may be used.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

In order to increase a processing speed of a data request, mapping information stored in a non-volatile memory of a storage may be loaded into a volatile memory of a host device so as to be used. The host device may process a logical to physical (L2P) address translation in a host by using the mapping information loaded into the volatile memory. The volatile memory of the host device has a size restriction, and therefore at least a part of the mapping information may be loaded so as to be used.

Aspects of the disclosure are to address at least the above-mentioned problems and/or disadvantages and to provide at least the advantages described below. Accordingly, an aspect of the disclosure is to provide an electronic device for managing mapping information loaded into a volatile memory of a host device.

Another aspect of the disclosure is to provide an electronic device and a method thereof which implement a file system for managing mapping information loaded into a volatile memory of a host device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a processor, a volatile memory, and a storage including a non-volatile memory, wherein the processor is configured to, in response to generation of a request for data included in a specific file, identify information of the specific file and a type of the request for the data, configure a flag for the request if the specific file is determined, based on the identified information of the specific file, to correspond to at least one in a list of a designated information table, identify, from the volatile memory on the basis of the flag, mapping information of a specific region, which includes a logical address of the data, in mapping information for mapping of logical addresses and physical addresses for the non-volatile memory of the storage, acquire, if the mapping information of the specific region, which includes the logical address of the data, exists in the volatile memory, a physical address of the non-volatile memory mapped to the logical address of the data, and transmit the request for the data, which includes the acquired physical address of the non-volatile memory, to the storage.

In accordance with another aspect of the disclosure, a method of an electronic device which includes a storage including a non-volatile memory is provided. The method includes in response to generation of a request for data included in a specific file, identifying information of the specific file and a type of the request for the data, based on the identified information of the specific file, configuring a flag for the request if the specific file is determined to correspond to at least one in a list of a designated information table, based on the flag, identifying, from a volatile memory, mapping information of a specific region, which includes a logical address of the data, in mapping information for mapping of logical addresses and physical addresses for the non-volatile memory of the storage, if the mapping information of the specific region, which includes the logical address of the data, exists in the volatile memory, acquiring a physical address of the non-volatile memory mapped to the logical address of the data, and transmitting the request for the data, which includes the acquired physical address of the non-volatile memory, to the storage.

Advantageous Effects of Invention

An electronic device and a method thereof according to various embodiments disclosed in the document are capable of managing mapping information loaded into a volatile memory of a host device.

Various embodiments disclosed in the document can provide an electronic device and a method thereof which implement a file system for managing mapping information loaded into a volatile memory of a host device.

An electronic device and a method thereof according to various embodiments disclosed in the document can improve a processing speed of a request for a user's desired data, by determining and managing a partial region of mapping information to be loaded in a volatile memory of a host device by a processor.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
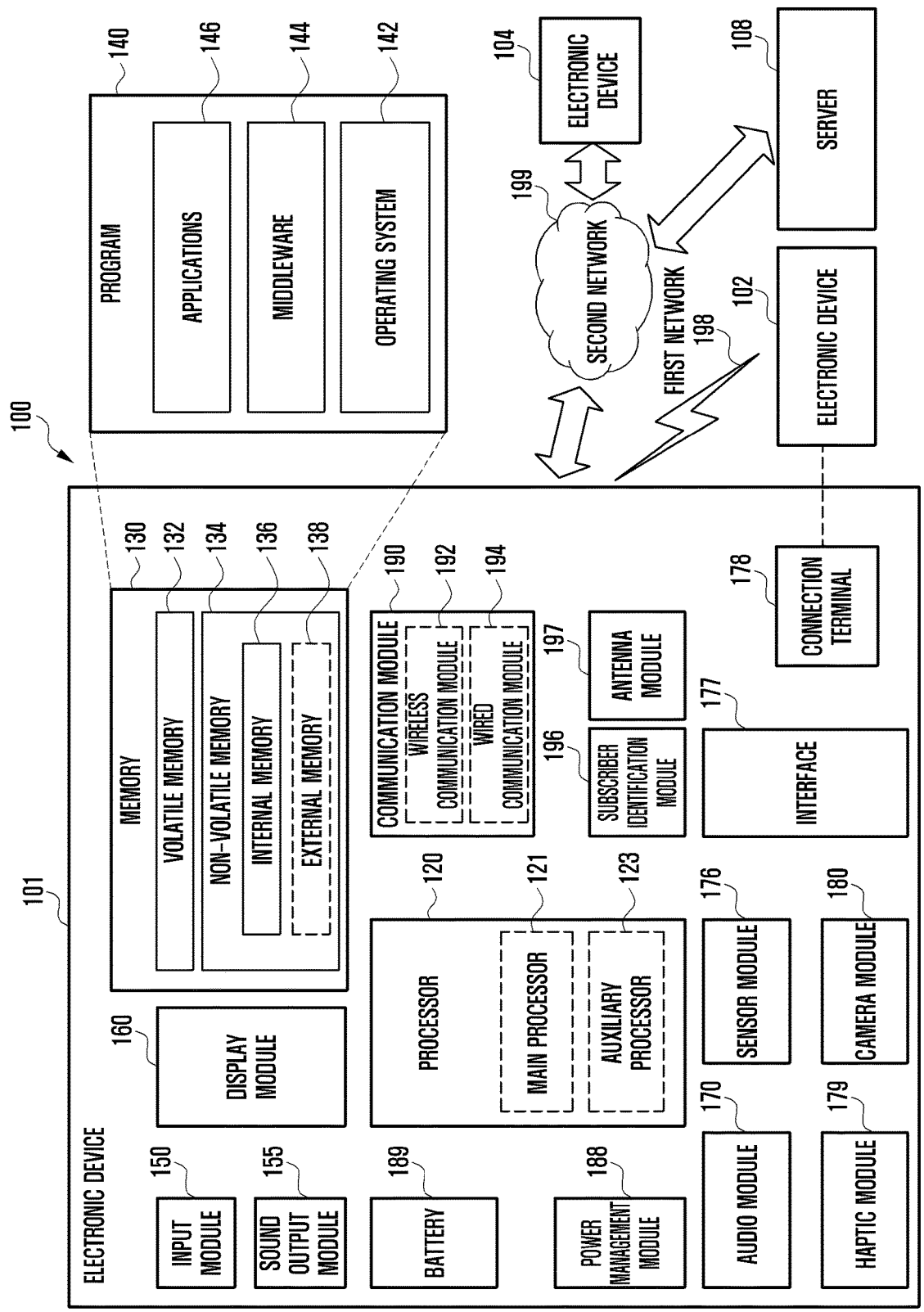
FIG. 1 is a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 and server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
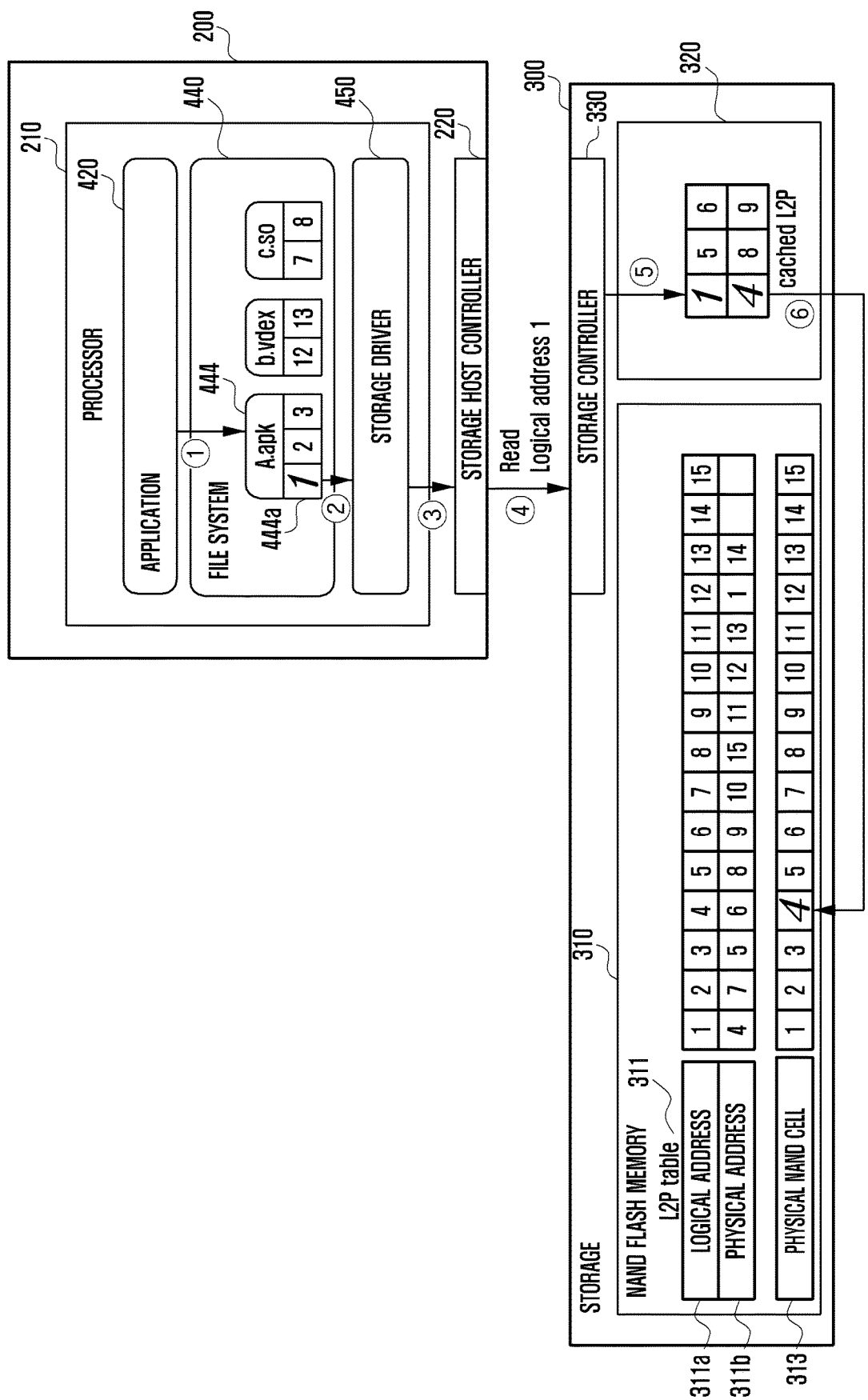
FIGS. 2A and 2B are block diagrams of an electronic device, illustrating procedures of processing a request for reading data, according to various embodiments of the disclosure.
Figure 2B:
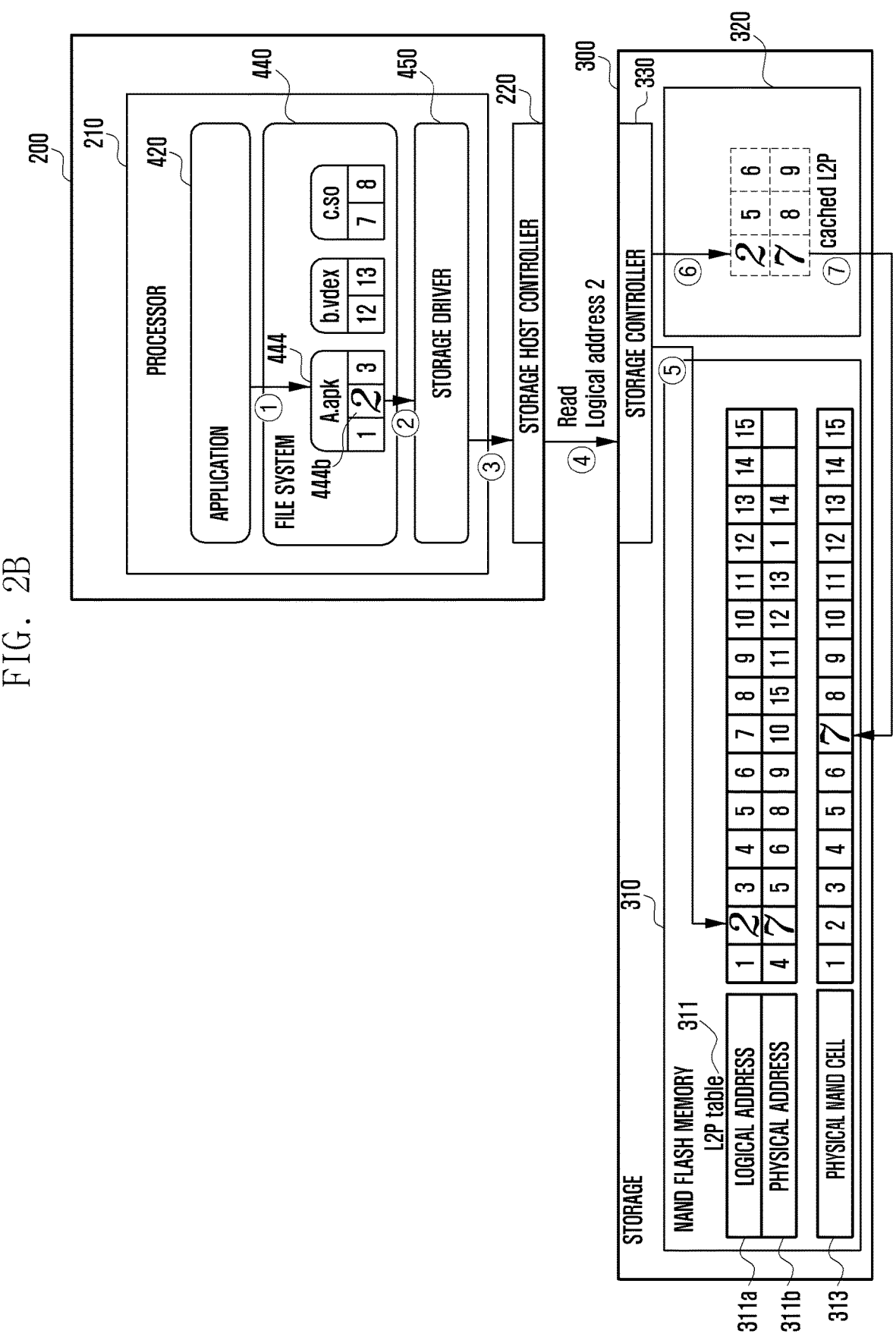

FIGS. 2A and 2B are block diagrams of an electronic device, illustrating procedures of processing a request for reading data, according to various embodiments of the disclosure.

FIG. 2A is a diagram illustrating a procedure in which, when a request for reading data is generated, if mapping information corresponding to the data is loaded in a cache 320 (or a volatile memory) of a storage 300, the electronic device (e.g., the electronic device 101 of FIG. 1) processes the request for reading the data according to various embodiments. FIG. 2B is a diagram illustrating a procedure in which, when a request for reading data is generated, if mapping information corresponding to the data is not loaded in the cache 320 of the storage 300, the electronic device (e.g., the electronic device 101 of FIG. 1) processes the request for reading the data according to various embodiments.

Referring to FIG. 2A, an electronic device (e.g., the electronic device 101 of FIG. 1) according to various embodiments may include a host 200 and the storage 300.

The host 200 according to various embodiments may include a processor 210 (e.g., the processor 120 of FIG. 1) and a storage host controller 220.

The processor 210 according to various embodiments may execute various software (e.g., the program 140). The processor 210 may execute, for example, an application 420, a file system 440, and/or a storage driver 450. Hereinafter, in the drawings, the application 420, the file system 440, and/or the storage driver 450 are illustrated to explain operations of the processor 210 for convenience of description, and may be implemented, for example, as software modules (e.g., the program 140) loaded into the volatile memory 132 of FIG. 1 so as to be executed by the processor 210. The storage 300 according to various embodiments may store various data used by at least one element of the electronic device. The storage 300 according to various embodiments may include a NAND flash memory 310 (or a non-volatile memory), the cache 320 (or a volatile memory), and a storage controller 330. The non-volatile memory may be, for example, a flash memory. The non-volatile memory may include, for example, a NAND flash memory that satisfies a universal flash storage (UFS) standard. The NAND flash memory 310 according to various embodiments may store mapping information 311 (e.g., a mapping table) indicating a relationship (mapping relationship) between a logical address 311a and a physical address 311b for stored data. The mapping information may store, for example, mapping information 311 (logical to physical (L2P) address mapping information, L2P table) for mutual mapping of the logical address 311a and the physical address 311b of the NAND flash memory 310. The cache 320 of the storage 300 may be a volatile memory, for example, RAM. The cache 320 according to various embodiments may, for example, store (or cache) mapping information (cached L2P) of a partial region of the mapping information 311 stored in the NAND flash memory 310. The storage controller 330 according to various embodiments may be an element that performs computing or data processing related to control and/or communication of each element of the storage 300.

According to various embodiments, a request (data read input/output (I/O) request, read I/O) for reading data included in a specific file may be generated via the application 420. In order to process the generated request for reading the data, the processor may identify, in operation ①, a logical address of the data included in the specific file via the file system 440. For example, when a request for reading data 444a included in an A.apk file 444 is generated, the processor may identify, via the file system 440, that a logical address of the data 444a is 1.

In operations ② and ③, the processor according to various embodiments may execute the storage driver 450 so as to transmit the data reading request including the logical address of the data to the storage host controller 220.

In operation ④, the processor according to various embodiments may transmit the data reading request including the logical address of the data to the storage via the host controller.

In the storage according to various embodiments, in operation ⑤, it may be determined under control of the storage controller 330 whether address information corresponding to the data is included in mapping information of a partial region, which is stored (or cached) in the cache 320 of the storage 300. For example, the cache 320 of the storage 300 may store a partial region of mapping information 311 (L2P table) stored in the NAND flash memory 310 (non-volatile memory). For example, the cache 320 of the storage 300 may store and use only a part of the mapping information 311 (L2P table) stored in the NAND flash memory 310 due to size restriction. When a request for data is processed using mapping information (cached L2P table) of a partial region stored in the cache 320 of the storage 300, there is no need to newly load the mapping information 311 stored in the NAND flash memory 310, and a processing speed may be thus improved.

According to various embodiments, when the mapping information of the partial region, which is stored in the cache 320 of the storage 300, includes address information corresponding to the data, the storage controller 330 may identify a physical address matching the logical address of the data from the mapping information of the partial region stored in the cache 320. For example, the storage controller 330 may determine that the physical address matching a logical address "1" of the data is 4, based on the mapping information of the partial region stored in the cache 320.

In operation ⑥, the storage controller 330 according to various embodiments may access the identified physical address of the data in a physical NAND cell 313 so as to process the request for reading the data.

FIG. 2B is a diagram illustrating a procedure in which, when a request for reading data is generated, if mapping information corresponding to the data is not loaded in the cache 320 of the storage 300, the electronic device (e.g., the electronic device 101 of FIG. 1) processes the request for reading the data according to various embodiments. Contents overlapping with the contents previously described in FIG. 2A will be omitted.

According to various embodiments, a request (data read I/O request, read I/O) for reading data included in a specific file may be generated via the application 420. In order to process the generated request for reading data, the processor 210 may identify, in operation ①, a logical address of the data included in the specific file via the file system 440. For example, when a request for reading data 444b included in the A.apk file 444 is generated, the processor may identify, via the file system 440, that a logical address of the data is 2.

In operations ② and ③, the processor 210 according to various embodiments may execute the storage driver 450 so as to transmit the data reading request including the logical address of the data to the storage host controller 220.

In operation ④, the processor 210 according to various embodiments may transmit the data reading request including the logical address of the data to the storage 300 via the storage host controller 220.

In the storage 300 according to various embodiments, it may be determined under control of the storage controller 330 whether address information corresponding to the data is included in mapping information of a partial region stored (or cached) in the cache 320 of the storage 300. Mapping information of a partial region illustrated by dotted lines in the cache 320 of the storage 300 is mapping information that has not yet been loaded from the NAND flash memory 310 and is not stored in the cache 320, and may refer to mapping information to be loaded later from the NAND flash memory 310. If the mapping information of the partial region stored in the cache 320 of the storage 300 does not include address information corresponding to the data, the storage controller 330 may load mapping information of the partial region, which includes a logical address "2" of the data, into the cache 320 of the storage 300 in operation ⑤ in the NAND flash memory 310.

In operation ⑥, the storage controller 330 according to various embodiments may load the mapping information of the partial region corresponding to the logical address "2" of the data from the NAND flash memory 310 into the cache 320 so as to store the same. The mapping information of the partial region indicated by dotted lines in the cache 320 of the storage 300 may refer to mapping information that is available after being loaded from the NAND flash memory 310.

The storage controller 330 according to various embodiments may identify a physical address matching the logical address of the data, via mapping information (cached L2P) of a partial region newly loaded into the cache 320. For example, the storage controller 330 may identify a physical address of 7 matching the logical address "2" of the data, via the mapping information of the partial region newly loaded into the cache 320.

In operation ⑦, the storage controller 330 according to various embodiments may access the identified physical address of the data in the physical NAND cell 313 so as to process the request for reading the data.

Figure 3:
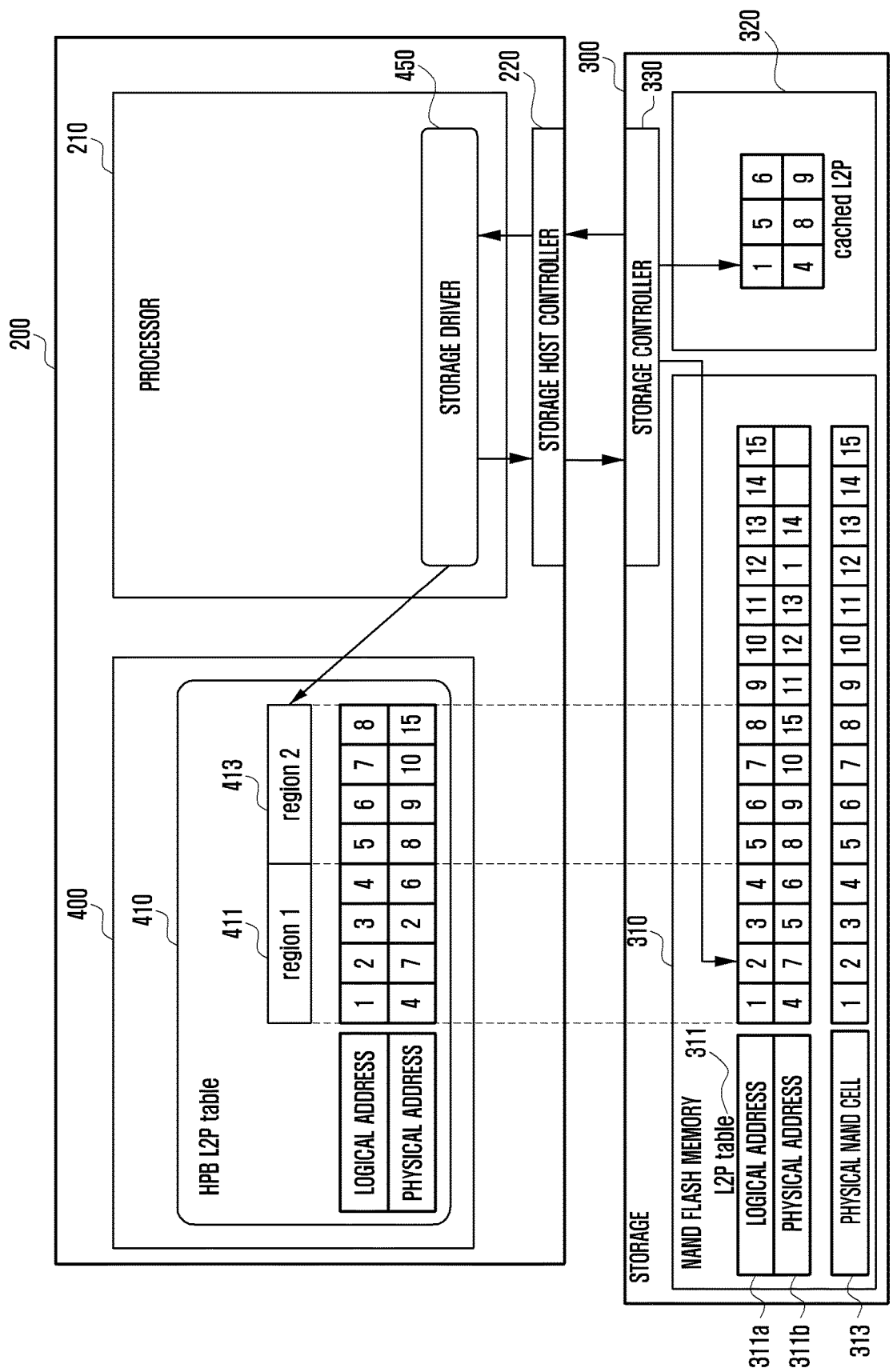
FIG. 3 is a block diagram of an electronic device, illustrating a host performance booster (HPB) function according to an embodiment of the disclosure.

FIG. 3 is a block diagram of an electronic device, illustrating a host performance booster (HPB) function according to an embodiment of the disclosure.

Referring to FIG. 3, an electronic device (e.g., the electronic device 101 of FIG. 1) according to various embodiments may include the storage 300 and a host 200 including the processor 210 (e.g., the processor 120 of FIG. 1) and a volatile memory 400 (e.g., volatile memory 132 of FIG. 1). According to various embodiments, the volatile memory 400 may be a RAM of a host end managed by the processor 210.

The storage 300 according to various embodiments may include the NAND flash memory 310 (or a non-volatile memory), the cache 320 (or a volatile memory), and a storage controller 330. The non-volatile memory may be, for example, a flash memory. The non-volatile memory may include, for example, the NAND flash memory 310 that satisfies a universal flash storage (UFS) standard. The NAND flash memory 310 according to various embodiments may store mapping information 311 indicating a relationship between the logical address 311a and the physical address 311b for stored data. The mapping information 311 may be, for example, mapping information (logical to physical address mapping information, L2P table) for mutual mapping of a logical address and a physical address of the NAND flash memory 310.

The volatile memory 400 according to various embodiments may load and store a partial region of mapping information from the NAND flash memory 310 (non-volatile memory) of the storage 300. The processor according to various embodiments may process a request for reading data by using a mapping table 410 (HPB L2P table) of the partial region stored in the volatile memory 400. For example, if a request for reading data corresponding to a logical address of 2 is generated, the processor may determine whether address information corresponding to the logical address "2" of the data is included in the mapping table 410 of the partial region stored in the volatile memory 400. The information corresponding to the logical address of 2 is included in mapping information 411 for region 1 in the mapping table 410 currently stored in the volatile memory 400, and the processor may thus identify that a physical address corresponding to the logical address "2" of the data is 7. The processor 210 may add the physical address to the request for reading the data so as to transfer the request to the storage 300. An operation of loading a part of the mapping information 311 for mutual mapping of the logical address 311a and the physical address 311b for the NAND flash memory 310 of the storage 300 into the volatile memory 400 of the host end, thereby causing the processor 210 of the host end to process logical/physical address translation may be, for example, a host performance booster (HPB) function defined in the UFS standard. When the HPB function is used, the operation of loading the mapping information of the partial region into the cache 320 of the storage 300, which is performed in the storage 300, and the operation (operation 6) of FIG. 2B) of translating the logical address to the physical address by using the mapping information (cached L2P) of the partial region loaded into the cache 320 of the storage 300 may be processed by the processor 210 of the host end, so that processing performance for the data request may be improved.

According to various embodiments, the mapping table (HPB L2P table or HPB L2P mapping table) loaded into the volatile memory 400 may be loaded and managed in a predetermined size unit (e.g., 16 MB, 32 MB, or 64 MB). The unit may be referred to as a region. For example, mapping information including logical addresses of 1, 2, 3, and 4 may be the mapping information 411 (region 1) of a first region, and mapping information including logical addresses of 5, 6, 7, and 8 may be mapping information 413 (region 2) of a second region. The HPB L2P mapping table 410 according to various embodiments may include metadata for determination of integrity of mapping information.

According to various embodiments, the processor 210 may load mapping information of the partial region of the mapping information from the NAND flash memory 310 of the storage 300 into the volatile memory 400. A detailed processing operation in response to generation of a request for data, by using the HPB function, will be described later.

Figure 4:
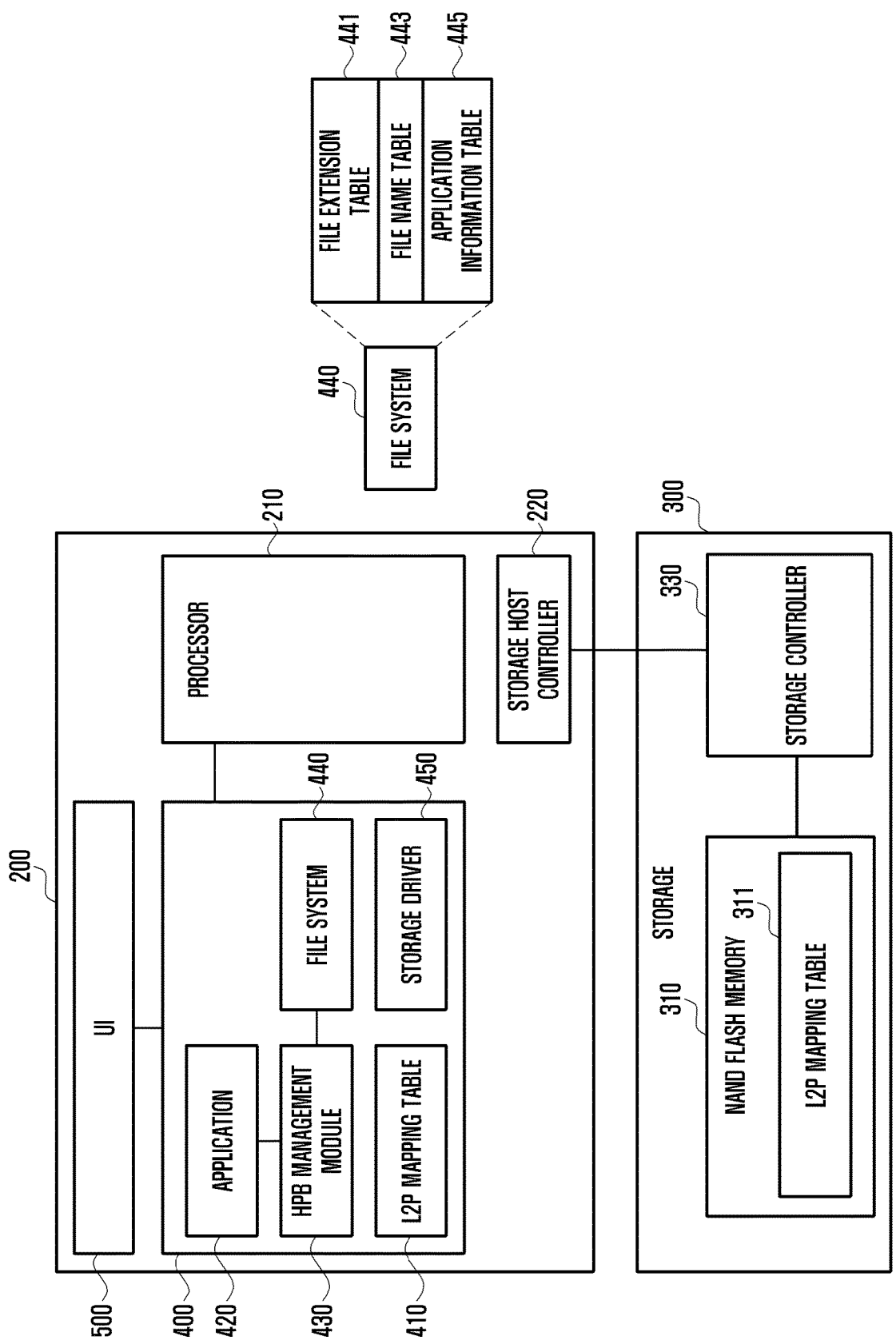
FIG. 4 is a block diagram of an electronic device according to an embodiment of the disclosure.

FIG. 4 is a block diagram of an electronic device according to an embodiment of the disclosure. FIG. 4 is a block diagram illustrating software and hardware layers of an electronic device according to various embodiments.

Referring to FIG. 4, the electronic device (e.g., the electronic device 101 of FIG. 1) according to various embodiments may be divided into the host 200 device and the storage 300. The host 200 according to various embodiments may correspond to an environment in which software including a user application and an operating system (OS) operates. The host 200 according to various embodiments may include the volatile memory 400 and the application processor 210. The volatile memory 400 according to various embodiments may load software (e.g., the application 420, an HPB management module 430, the file system 440, and/or the storage driver 450) (e.g., the program 140 of FIG. 1) including one or more instructions. For example, the processor 210 of the electronic device 101 may call at least one instruction among one or more stored instructions from the volatile memory 400 and may execute the same. For example, the application processor 210 of the electronic device 101 may load the application 420 and/or the HPB management module 430 stored in the memory 400 into the volatile memory 400, and may call one or more instructions from the loaded application 420 and/or HPB management module 430 so as to execute the instructions. The volatile memory 400 is, for example, a volatile memory and may store the HPB L2P mapping table 410 that is mapping information of the partial region loaded from the NAND flash memory 310 of the storage 300. The host 200 may transfer, for example, various requests (data I/O request) for data, which are generated during software operations, to the storage 300.

The application processor 210 according to various embodiments is a hardware device that executes software loaded into the volatile memory 400 and may perform a software module operation. The application processor 210 according to various embodiments may include the file system 440, the storage driver 450, and the storage host controller 220. The file system 440 and the storage driver 450 may be software executed in a processor (not shown) (e.g., the processor 120 of FIG. 1 and the processor 210 of FIGS. 2A and 2B). The application 420 and/or the HPB management module 430 may be software executed in the processor.

According to various embodiments, the processor may be an element capable of performing computing or data processing related to control and/or communication of each element of the electronic device. The processor may, for example, be operatively connected to elements of the electronic device. The processor may load a command or data received from another element of the electronic device into a memory, process the command or data stored in the memory, and store result data.

The file system 440 according to various embodiments is a software module that manages files stored in the storage 300, and may support reading/writing/deleting requests for basic file data and manage attributes and authorities of files. When a request is made for data included in a specific file, the file system 440 according to various embodiments may determine whether the data of the file is maintained/managed by the L2P mapping table 410 stored in the volatile memory 400 of the host 200 end, based on information of the specific file. According to various embodiments, depending on whether the information of the specific file corresponds to at least one in lists of designated tables, for example, a file extension table 441, a file name table 443, and/or an application information table 445, the file system 440 may determine whether the data of the file is maintained/managed by the L2P mapping table 410 stored in the volatile memory 400 of the host 200 end. According to various embodiments, the file system 440 may store, in the tables, the information of the file maintained/managed by the L2P mapping table 410 stored in the volatile memory 400 of the host 200 end. According to various embodiments, the file system 440 may identify, based on the information of the specific file, related application information and a name, extension, attribute, or authority of the specific file, so as to determine whether to maintain/manage the L2P mapping table 410 stored in the volatile memory 400 of the host 200 end. For example, if it is determined that the L2P mapping table stored in the volatile memory 400 is managed by the volatile memory 400, the file system 440 may configure a flag (HOST HPB flag) for the request for data included in the file.

The file system 440 according to various embodiments may generate, delete or update lists of the file extension table 441, file name table 443, and/or application information table 445, based on HPB function configuration information input via a user interface (e.g., the input module 150 of FIG. 1). The file system 440 according to various embodiments may generate, delete, or update the lists of the file extension table 441, file name table 443, and/or application information table 445, based on history information of the application and/or file, for example, user-selected application and/or file lists or application and/or file lists according to a recent frequency of use or a highest frequency of use.

The storage driver 450 according to various embodiments is a software module for communication with the storage 300 and may manage the L2P mapping table 410 stored in the volatile memory 400 of the host 200 end by using the HPB function. The storage driver 450 may, for example, manage the L2P mapping table 410 stored in the volatile memory 400, based on whether a flag is configured for the request for the data, which is transferred via the file system 440, and a type of the request for the data.

The storage host controller 220 according to various embodiments may be a hardware module in charge of communication between the application processor 210 of the host and the storage 300.

The volatile memory 400 according to various embodiments is a volatile memory used by the application processor 210, and may temporarily store driving software and data required for a software operation. If the storage 300 supports the HPB function, the L2P mapping table 410 that is mapping information of the partial region loaded from the NAND flash memory 310 of the storage 300 may be stored.

The L2P mapping table 410 according to various embodiments is a part of the L2P mapping information 311 loaded from the storage 300 into the volatile memory 400 of the host 200, and may be used when the request for reading data stored in the storage 300 is processed, and maintained and managed by the storage driver 450. According to various embodiments, the L2P mapping table 410 stored in the volatile memory 400 may include a reference flag and an update flag (need-update flag). The reference flag may be, for example, flag information indicating whether mapping information of a corresponding region is managed by the host 200 (i.e., whether the mapping information is managed in the volatile memory 400). For example, if a reference flag value of the mapping information of the specific region is configured to 1, this may indicate that the mapping information of the specific region is managed by the host 200, and if the reference flag value of the mapping information of the specific region is configured to 0, this may indicate that the mapping information of the specific region is not managed by the host 200. The update flag may be, for example, flag information indicating whether the mapping information of the specific region stored in the volatile memory 400 of the host 200 end needs to be updated. For example, if an update flag value of the mapping information of the specific region is configured to 1, this may indicate that the mapping information of the specific region needs to be updated from the NAND flash memory 310, and if the update flag value is configured to 0, this may indicate that the mapping information of the specific region does not need to be updated. According to various embodiments, the reference flag and the update flag may be configured for each region of the L2P mapping table 410.

According to various embodiments, the storage 300 may include the NAND flash memory 310, the storage controller 330, and the cache 320 (not shown).

The NAND flash memory 310 according to various embodiments is a non-volatile memory and may be a space in which data is physically stored. According to various embodiments, the NAND flash memory 310 may store the L2P mapping information 311 (e.g., a mapping table).

The L2P mapping information 311 in the NAND flash memory 310 according to various embodiments may be all mapping information for mutual mapping of logical addresses and physical addresses of the NAND flash memory 310. A part of the L2P mapping information 311 in the NAND flash memory 310 may be loaded into the cache 320 of the storage 300 so as to be used. If the storage 300 supports the HPB function, a part of the L2P mapping information 311 in the NAND flash memory 310 may be loaded into the volatile memory 400 of the host 200 end so as to be used.

The storage controller 330 according to various embodiments may be a hardware module in charge of communication between the application processor 210 of the host 200 and the storage 300. The storage controller 330 may process, for example, a request for data received from the host 200 and may manage the L2P mapping information 311 in the NAND flash memory 310.

Figure 5:
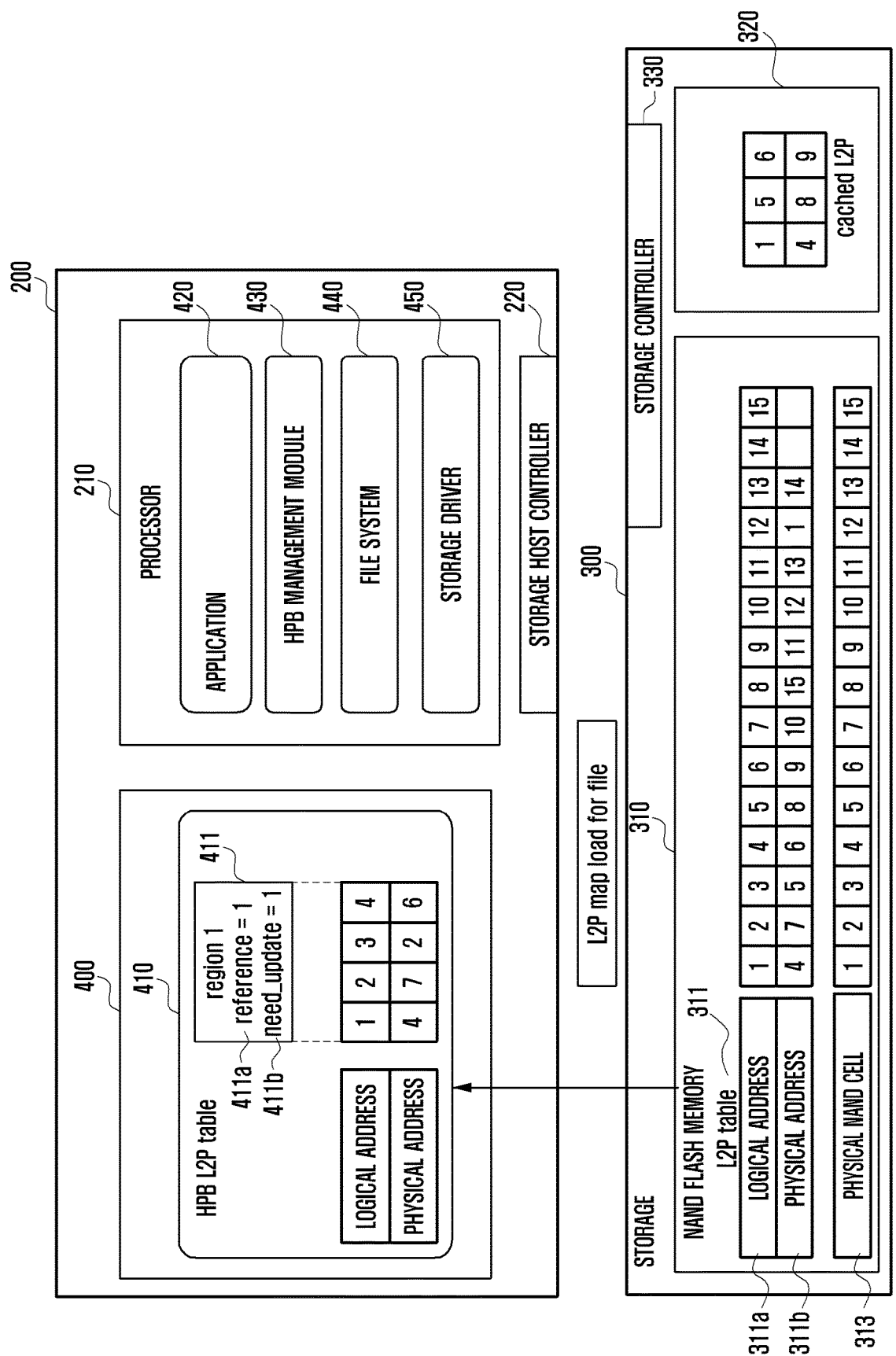
FIG. 5 is a block diagram of an electronic device, illustrating that the electronic device performs an HPB function according to an embodiment of the disclosure.

FIG. 5 is a block diagram of an electronic device, illustrating that the electronic device performs an HPB function according to an embodiment of the disclosure.

Referring to FIG. 5, an electronic device (e.g., the electronic device 101 of FIG. 1) according to various embodiments may include the storage 300 and the host 200 including the application processor 210 and the volatile memory 400. Contents overlapping with those described above will be omitted.

The processor 210 according to various embodiments may execute various software (e.g., the program 140). The processor 210 may execute, for example, the application 420 (e.g., the application 420 of FIG. 4), the HPB management module 430 (e.g., the HPB management module 430 of FIG. 4), the file system 440 (e.g., the file system 440 of FIG. 4), and/or the storage driver 450 (e.g., the storage driver 450 in FIG. 4). Hereinafter, in FIG. 5 to FIG. 10, the application 420, the file system 440, and/or the storage driver 450 are illustrated to explain the operation of the processor 210 for convenience of description, and may be implemented, for example, as software modules (e.g., the program 140 of FIG. 1) loaded into the volatile memory 400 (e.g., the volatile memory 132 of FIG. 1) so as to be executed by the processor 210.

If the storage 300 supports the HPB function, the processor 210 according to various embodiments may load mapping information (HPB L2P table) of a specific region from the storage 300 into the volatile memory 400, and the processor 210 may manage the mapping table 410 of the specific region stored in the volatile memory 400. The processor 210 may process the request for reading data, by using, for example, the mapping table 410 of the specific region stored in the volatile memory 400.

The processor 210 according to various embodiments may configure a flag for the request for data, and may manage the mapping table (HPB L2P mapping table) 410 stored in the volatile memory 400, based on whether a flag is configured for the request for data and a type of the request for data.

Referring to the volatile memory 400 illustrated in FIG. 5, according to the HPB L2P table 410 stored in the volatile memory 400, it may be seen that mapping information 411 corresponding to a first region (region 1) in the L2P mapping table 410 is loaded. If a reference flag 411a of the mapping information 411 of the first region is configured to 1 (reference=1), the mapping information 411 of the first region may be stored in the volatile memory 400, which indicates that the mapping information 411 of the first region is determined to be managed by the host 200 end. If an update flag 411b of the mapping information 411 of the first region is configured to 1 (need_update=1), this may indicate that the mapping information 411 of the first region needs to be updated.

The processor 210 according to various embodiments may transmit, to the storage 300, an update request for the mapping information 411 of the first region, for which the update flag 411b is configured to 1. The processor 210 according to various embodiments may receive the mapping information of the specific region from the storage 300 so as to perform update in the volatile memory 400.

When a request for data included in a specific file is generated, the processor 210 according to various embodiments may determine, based on information of the file, whether mapping information of a region (e.g., a first region) corresponding to the data of the file is a file managed by the HPB L2P table 410 stored in the volatile memory 400.

According to various embodiments, the processor 210 may determine whether mapping information of a region corresponding to the data included in the specific file, for which the request has been generated, is designated to be managed in the volatile memory 400 of the host end, by referring to the file extension table 441, the file name table 443, and/or the application information table 445 via the file system 440.

The processor 210 according to various embodiments may determine whether the data of the file is maintained/managed by the L2P mapping table 410 stored in the volatile memory 400 of the host 200 end, according to whether the information of the specific file corresponds to at least one in the lists of designated tables, for example, the file extension table 441, the file name table 443, and/or the application information table 445.

According to an embodiment, the processor 210 may determine, for example, whether application information related to the specific file is stored in the application information table 445. The processor 210 may determine, for example, whether a name of the specific file 444 is stored in the file name table 443. The processor 210 may determine, for example, whether an extension of the specific file 444 is stored in the file extension table 441.

According to an embodiment, in order to determine whether the file is a file generated and/or used according to execution a designated application, the processor 210 may identify, based on information of the file via the file system 440, information of the designed application, the name of the specific file, and the extension and attribute information so as to determine whether the file is a file generated and/or used according to execution of the designated application. The processor 210 may refer to, for example, the application information table 445, with respect to whether the file is related to the designated application, and if at least one of a package name, an application or process name, and/or a process ID is included in the application information table 445, the file may be determined to be a file used for execution of the designated application. According to an embodiment, the processor 210 may determine, by referring to the file name of the specific file, whether the file is a file designated, for example, according to selection of a user, so that the mapping information of the specific region corresponding to the data of the file is managed in the volatile memory 400 of the host 200 end. According to an embodiment, the processor 210 may determine, by referring to the file name of the specific file, whether the file is, for example, a file generated according to execution of the designated application, and may cause the mapping information of the specific region corresponding to the data of the file to be managed in the volatile memory 400 of the host 200 end.

According to various embodiments, when a request for data included in a specific file is generated, the processor 210 may, in order to determine whether the file is a file generated and/or used according to execution of a designated application, allow reference of the file extension table 441, the file name table 443, and/or the application information table 445 of the file system 440.

According to various embodiments, if the specific file is determined to be a file to be used for entering the designated application, the processor 210 may configure a flag for the request for the data, and may determine that mapping information of a specific region, which includes a physical address of the data, is managed in the volatile memory 400 of the host 200 end.

According to various embodiments, if the executed application or the specific file is determined to be a file stored in the tables managed by the file system 440, the processor 210 may configure a flag for the request for the data, and may determine that the mapping information of the specific region, which includes the physical address of the data, is managed in the volatile memory 400 of the host 200 end. Based on the disclosed method, in order to smoothly perform the HPB function, the processor 210 may determine and manage, by referring to the tables 441, 443, and/or 445 managed by the file system 440, a specific region to be managed in the volatile memory 400 from the mapping information 311 (L2P mapping table).

The disclosed method has mainly provided descriptions for a case where a request for data is generated when a specific application is executed (at entering of the specific application), but the method is surely applicable not only for the above case but also a case for improving data request processing performance for user-designated files, a case for improving data request processing performance for frequently accessed files, or a case for improving data request processing performance for recently accessed files. Hereinafter, for convenience of explanation, a case of processing a request for data, which is generated when an application is executed, will be mainly described.

According to various embodiments, an electronic device (e.g., the electronic device 101 of FIG. 1) may include a processor (e.g., the processor 120 of FIG. 1 or the processor 210 of FIG. 5), and a storage (e.g., the storage 300 of FIG. 5) including a volatile memory (e.g., the volatile memory 400 of FIG. 5) and a non-volatile memory (e.g., the NAND flash memory 310 of FIG. 5), wherein the processor is configured to, in response to generation of a request for data included in a specific file, identify information of the specific file and a type of the request for the data, configure a flag for the request if the specific file is determined, based on the identified information of the specific file, to correspond to at least one in a list of a designated information table, identify, from the volatile memory on the basis of the flag, mapping information of a specific region, which includes a logical address of the data, in mapping information for mapping of logical addresses and physical addresses for the non-volatile memory of the storage, acquire, if the mapping information of the specific region, which includes the logical address of the data, exists in the volatile memory, a physical address of the non-volatile memory mapped to the logical address of the data, and transmit the request for the data, which includes the acquired physical address of the non-volatile memory, to the storage.

According to various embodiments, the designated information table may be configured to include at least one of a designated application information table, file extension information table, and file name information table.

According to various embodiments, the processor may be configured to receive configuration information for a specific application via a user interface, and to update the designated information table, based on the configuration information for the specific application.

According to various embodiments, the processor may be configured to provide a screen including an icon menu for selection of the configuration information for the specific application.

According to various embodiments, the processor may be configured to update the designated information table, based on a file list or application list relating to a recent frequency of use, or a file list or an application list relating to a highest frequency of use.

According to various embodiments, if the mapping information of the specific region is not stored in the volatile memory, the processor may be configured to transmit, to the storage, the request for the data, which includes the logical address of the data.

According to various embodiments, the processor may be configured to transmit an update request for the mapping information of the specific region in the volatile memory to the storage, and receive the mapping information of the specific region from the storage so as to store the received mapping information in the volatile memory.

According to various embodiments, the processor may be configured to transmit the update request to the storage in response to completion of processing of the request for the data.

According to various embodiments, the processor may be configured to transmit the update request to the storage in response to no request for data currently being processed.

According to various embodiments, in response to the request for the data being a writing request for the data, the processor may be configured to transmit an update request for the mapping information of the specific region in the first volatile memory to the storage and receive the mapping information of the specific region from the storage so as to update the mapping information of the specific region in the first volatile memory.

Figure 6:
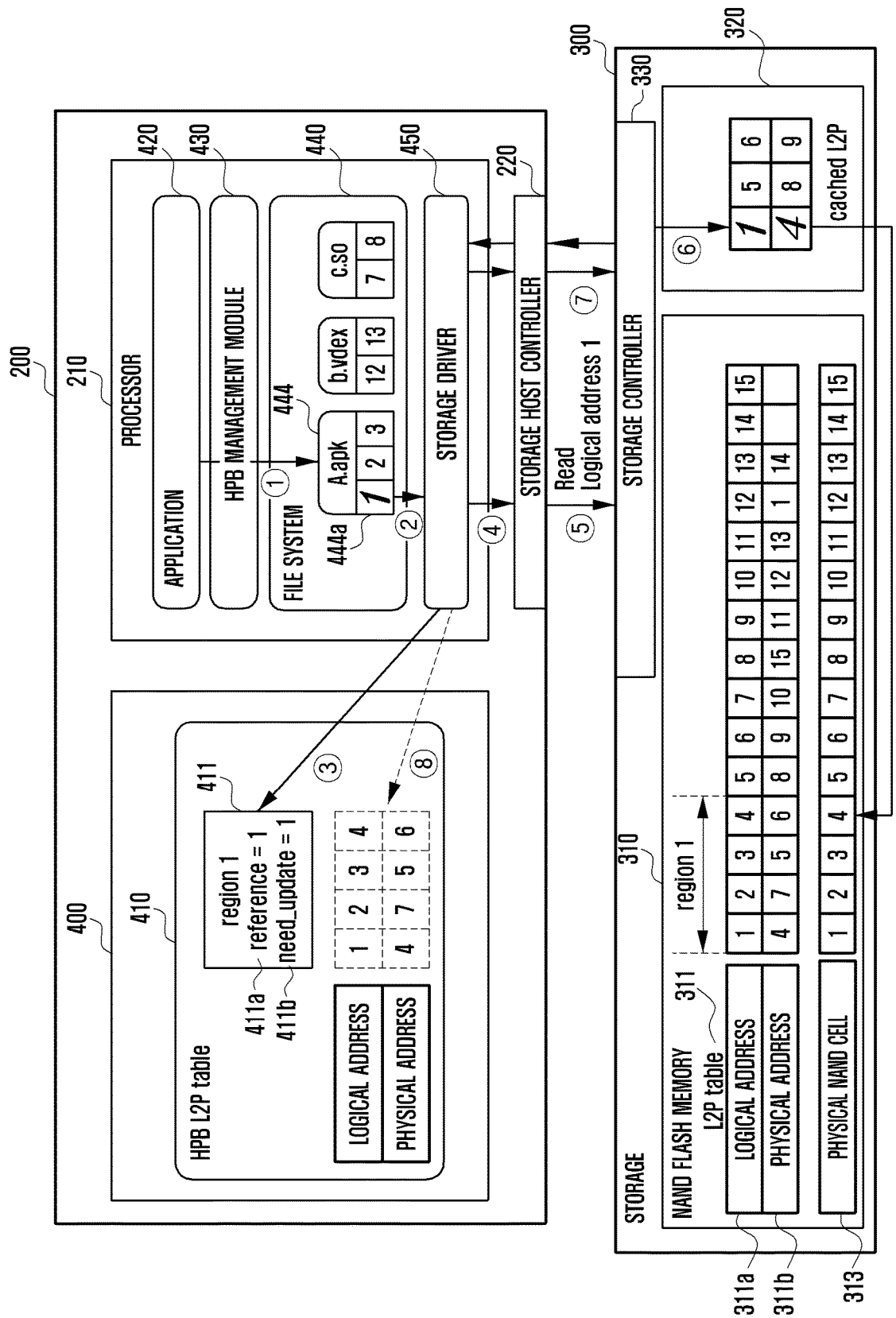
FIGS. 6 and 7 are block diagrams of an electronic device, illustrating procedures in which the electronic device processes a request for reading data according to various embodiments of the disclosure.
Figure 7:
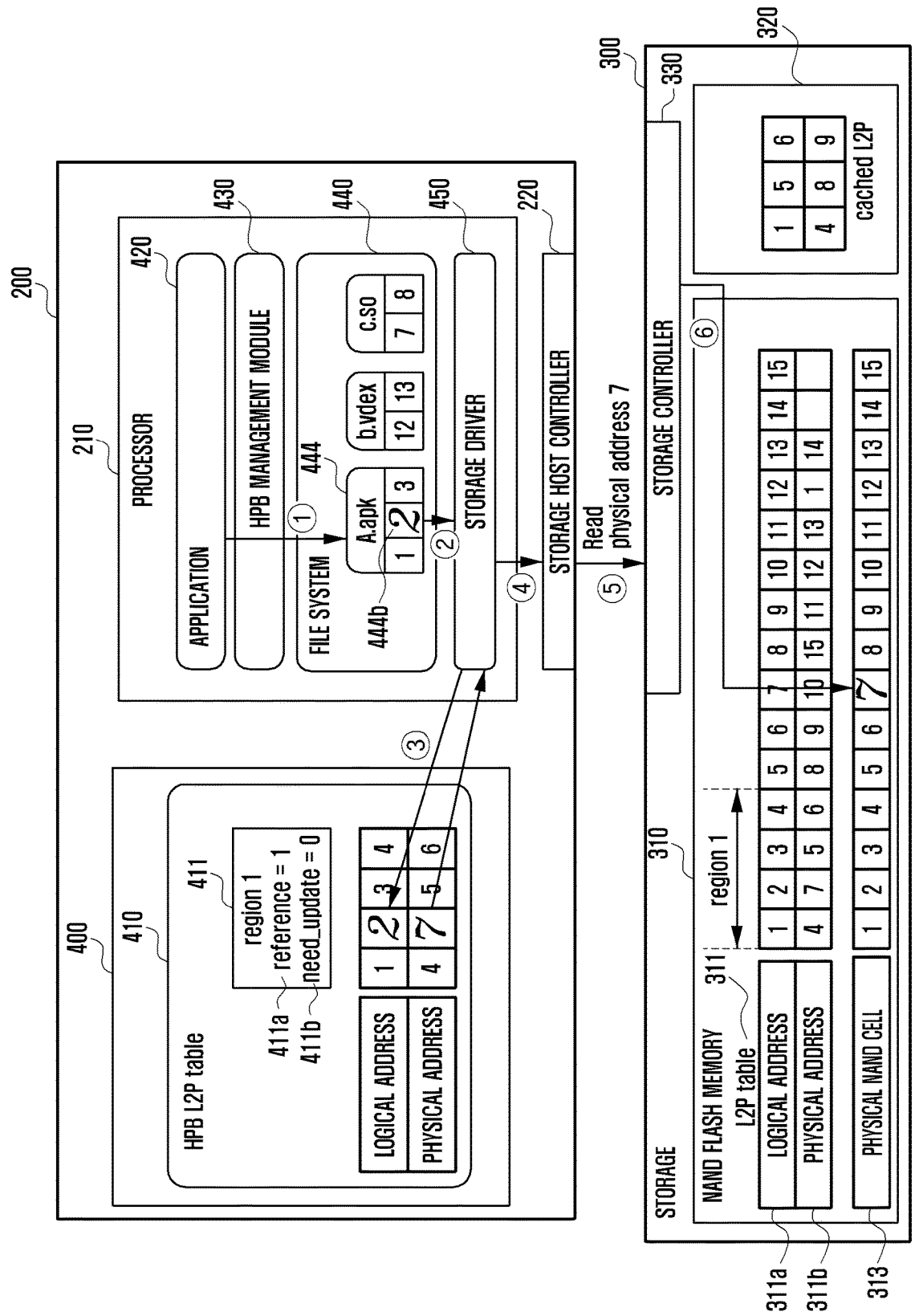

FIGS. 6 and 7 are block diagrams of an electronic device, illustrating procedures in which the electronic device processes a request for reading data according to various embodiments of the disclosure.

FIG. 6 is a diagram illustrating a procedure in which, when a request for reading data is generated, if no mapping information of a specific region corresponding to the data exists in the volatile memory 400 of the host 200 end, an electronic device processes the data reading request according to an embodiment of the disclosure.

Referring to FIG. 6, in operation ①, the processor 210 according to various embodiments may identify generation of a request (data read I/O request) for reading data included in a specific file according to execution of an application (e.g., YouTube). The processor 210 according to various embodiments may identify a type of the generated request for data (e.g., a reading/writing/deleting request). The processor 210 according to various embodiments may identify, via the file system 440, a logical address of the data in the specific file, for which the data reading request has been generated.

The processor 210 according to various embodiments may identify, in operation 2; via the file system 440, information on the specific file 444, for which the data reading request has been generated.

When a request for data included in a specific file is generated, the processor 210 according to various embodiments may determine, based on information of the file, whether mapping information of a region (e.g., a first region) corresponding to the data of the file is a file managed by the HPB L2P table 410 stored in the volatile memory 400.

According to various embodiments, the processor 210 may determine whether mapping information of a region corresponding to the data included in the specific file, for which the request has been generated, is designated to be managed in the volatile memory 400 of the host end, by referring to the file extension table 441, the file name table 443, and/or the application information table 445 via the file system 440.

The processor 210 according to various embodiments may determine whether the data of the file is maintained/managed by the L2P mapping table 410 stored in the volatile memory 400 of the host 200 end, according to whether the information of the specific file corresponds to at least one in the lists of designated tables, for example, the file extension table 441, the file name table 443, and/or the application information table 445.

According to an embodiment, the processor 210 may determine, for example, whether application information related to the specific file is stored in the application information table 445. The processor 210 may determine, for example, whether a name of the specific file 444 is stored in the file name table 443. The processor 210 may determine, for example, whether an extension of the specific file 444 is stored in the file extension table 441.

The processor 210 may identify, for example, application and file information related to the specific file 444. The processor 210 may identify, for example, application information including a process ID, a package name, and/or a name of an application or process which is executed using the specific file 444, uses the specific file 444 during execution, or is executed to load the specific file 444. The processor 210 may identify, for example, name, extension, and attribute information of the specific file 444. The processor 210 may determine, for example, whether the application information related to the specific file 444 is stored in the application information table 445. The processor 210 may determine, for example, whether a name of the specific file 444 is stored in the file name table 443. The processor 210 may determine, for example, whether an extension of the specific file 444 is stored in the file extension table 441.

The processor 210 according to various embodiments may cause application and/or file information designated according to a user's selection to be stored in the tables 441, 443, and/or 445 so as to be managed. The processor 210 according to various embodiments may cause file information to be stored in the tables 441, 443, and/or 445 so as to be managed, based on a file list (least recently used list, LRU list) relating to a recent frequency of use or a file list relating to a highest frequency of use. The processor 210 according to various embodiments may record applications and/or files, which are most frequently accessed via an operating system (OS) or machine learning, in the tables 441, 443, and/or 445 and manage the applications and/or files as a list.

The processor 210 according to various embodiments may configure a flag (HOST HPB flag) for the generated data reading request, based on the identified application information of the file and/or file information including the file extension or name information. The processor 210 may configure, for example, the flag (HOST HPB flag) for the generated data reading request in response to the specific file 444 being a file used for executing the specific application. The processor 210 may configure, for example, the flag (HOST HPB flag) for the generated data reading request in response to the specific file 444 being included in the lists of the tables 441, 443, and/or 445.

The processor 210 according to various embodiments may, for example, identify that the extension of the specific file 444, for which the data reading request has been generated, is apk and is stored in the file extension table 441, so as to configure the flag (HOST HPB flag) for the generated data reading request.

The processor 210 according to various embodiments may determine, in operation ③, whether a flag has been configured for the generated data reading request and whether the mapping information of the specific region, which includes the logical address of the data, is stored in the volatile memory 400. The mapping information 411 of a first region (region 1) illustrated by dotted lines in the volatile memory 400 has not yet been loaded from the NAND flash memory 310 (non-volatile memory) and is thus mapping information that has not yet been stored in the volatile memory 400, and may be indicated to be mapping information that is to be loaded later from the NAND flash memory 310. It is assumed that the specific region of the mapping information including the specific data is the first region (region 1) 411. Since a flag is currently configured for the generated data reading request, the processor 210 may determine that the mapping information 411 of the specific region including the data is managed in the volatile memory 400 of the host end. The processor 210 may configure the reference flag 411a of the mapping information 411 of the first region to 1, in relation to information relating to the first region (region 1) in mapping information to be stored in the volatile memory 400. The value of the reference flag 411a of the mapping information of the first region (region 1) may indicate that the mapping information 411 of the first region is managed in the volatile memory 400 of the host 200 end. The mapping information 411 of the first region is not currently stored (indicated by dotted lines) in the volatile memory 400, and the processor 210 may thus configure the update flag 411b (need_update flag) of the mapping information 411 of the first region to 1, in relation to the information relating to the first region in the mapping information to be stored in the volatile memory 400. The value of the update flag 411b of the mapping information 411 of the first region (region 1) may indicate that the mapping information 411 of the first region needs to be updated from the NAND flash memory 310 (non-volatile memory) of the storage 300 to the volatile memory 400.

In operation ④, the processor 210 according to various embodiments may execute the storage driver 450 so as to transmit the data reading request including the logical address of the data to the storage host controller 220. For example, the mapping information 411 of the first region is not currently stored in the volatile memory 400, and therefore the processor 210 may not be able to identify a physical address of the specific data by using the information stored in the volatile memory 400. The processor 210 may transmit the data reading request including the logical address of the specific data to the storage host controller 220. For example, the data reading request including a logical address "1" of the specific data may be transmitted to the storage host controller 220.

In operation ⑤, the processor 210 according to various embodiments may transmit the data reading request including the logical address of the data to the storage 300 via the storage host controller 220.

In the storage 300 according to various embodiments, it may be determined, in operation 6), under control of the storage controller 330 whether address information corresponding to the data is included in mapping information of a partial region stored (or cached) in the cache 320 (volatile memory) of the storage 300. For example, the cache 320 of the storage 300 may store a partial region of the mapping information 311 (L2P table) stored in the NAND flash memory 310 (non-volatile memory). For example, the cache 320 of the storage 300 may store and use, due to a small size thereof, only a part of the mapping information 311 (L2P table) stored in the NAND flash memory 310. If the mapping information of the partial region, which is stored in the cache 320 of the storage 300, includes address information corresponding to the data, the storage controller 330 may identify a physical address mapped to the logical address of the data from the mapping information of the partial region stored in the cache 320. In the storage controller 330 according to various embodiments, the request for reading the data may be processed by accessing the physical address of the data, which is identified in a physical NAND cell.

The processor 210 according to various embodiments may transmit, in operation ⑦, an update request for the mapping information 411 of the specific region in the volatile memory 400 to the storage 300 by executing the storage driver 215. For example, the update flag 411b for the mapping information 411 of the first region in the volatile memory 400 is configured to 1, and the processor 210 may thus transmit the update request for the mapping information 411 of the first region to the storage 300. The storage 300 according to various embodiments may extract the mapping information 411 of the first region and transmit the same to the processor 210, in response to reception of the update request.

The processor 210 according to various embodiments may, in operation ⑧, receive the mapping information of the specific region from the storage 300 and store the same in the volatile memory 400. The mapping information 411 of the first region illustrated by dotted lines in the volatile memory 400 may indicate being loaded into the volatile memory 400 via operation ⑧. When the update of the mapping information 411 of the specific region is completed, the processor 210 according to various embodiments may change, to 0, the update flag 411b (need_update flag) of the mapping information 411 of the first region stored in the volatile memory 400. The value of the update flag 411b of the mapping information 411 of the first region being 0 may indicate that the mapping information 411 of the first region stored in the volatile memory 400 does not need to be updated.

According to various embodiments, operation 7 and operation 8, which are operations of updating the mapping information of the specific region, may be performed in response to completion of processing the data reading request, and may be performed in response to no data request currently being processed due to completion of all the processing of the data request.

FIG. 7 is a diagram illustrating a procedure in which, when a request for reading data is generated, if mapping information of a specific region corresponding to the data exists in the volatile memory 400 of the host 200 end, an electronic device processes the data reading request according to an embodiment of the disclosure. Contents overlapping with the contents described in FIG. 6 will be omitted.

Referring to FIG. 7, in operation ①, the processor 210 according to various embodiments may identify generation of a request (data read I/O request) for reading data included in a specific file according to execution of an application. The processor 210 according to various embodiments may identify, via the file system 440, a logical address of the data in the specific file, for which the data reading request has been generated. For example, the processor 210 may identify that a reading request has been generated for the data 444b corresponding to a logical address of 2 among data included in the A.apk file 444.

The processor 210 according to various embodiments may identify, in operation ② via the file system 440, information on the specific file 444, for which the data reading request has been generated.

When a request for data included in a specific file is generated, the processor 210 according to various embodiments may determine, based on information of the file, whether mapping information of a region (e.g., a first region) corresponding to the data of the file is a file managed by the HPB L2P table 410 stored in the volatile memory 400.

According to various embodiments, the processor 210 may determine whether mapping information of a region corresponding to the data included in the specific file, for which the request has been generated, is designated to be managed in the volatile memory 400 of the host end, by referring to the file extension table 441, the file name table 443, and/or the application information table 445 via the file system 440.

The processor 210 according to various embodiments may determine whether the data of the file is maintained/managed by the L2P mapping table 410 stored in the volatile memory 400 of the host 200 end, according to whether the information of the specific file corresponds to at least one in the lists of designated tables, for example, the file extension table 441, the file name table 443, and/or the application information table 445.

According to an embodiment, the processor 210 may determine, for example, whether application information related to the specific file is stored in the application information table 445. The processor 210 may determine, for example, whether a name of the specific file 444 is stored in the file name table 443. The processor 210 may determine, for example, whether an extension of the specific file 444 is stored in the file extension table 441.

The processor 210 may identify, for example, application and file information related to the specific file 444. The processor 210 may identify, for example, application information including a name of an application which is executed using the specific file 444, uses the specific file 444 during execution, or is executed to load the specific file 444. The processor 210 may identify, for example, name, extension, and attribute information of the specific file 444. The processor 210 may determine, for example, whether the application information related to the specific file 444 is stored in the application information table 445. The processor 210 may determine, for example, whether a name of the specific file 444 is stored in the file name table 443. The processor 210 may determine, for example, whether an extension of the specific file 444 is stored in the file extension table 441.

The processor 210 according to various embodiments may configure a flag (HOST HPB flag) for the generated data reading request, based on the identified application information of the file 444 and/or file information including the file extension or name information.

The processor 210 according to various embodiments may, for example, identify that the extension of the specific file 444, for which the data reading request has been generated, is apk and is stored in the file extension table 441, so as to configure the flag (HOST HPB flag) for the generated data reading request.

The processor 210 according to various embodiments may determine, in operation ③, whether a flag has been configured for the generated data reading request and whether the mapping information (HPB L2P table) of the specific region, which includes the logical address of the data, is stored in the volatile memory 400 (first volatile memory). The mapping information 411 of a first region (region 1) illustrated by solid lines in the volatile memory 400 may indicate that the mapping information 411 of the first region has been loaded from the NAND flash memory 310 (non-volatile memory) and is currently stored in the volatile memory 400. It is assumed that the specific region of the mapping information including the specific data is the first region (region 1) 411. Since a flag is currently configured for the generated data reading request, the processor 210 may determine that the mapping information 411 of the specific region including the data is managed in the volatile memory 400 of the host end. The processor 210 may configure the reference flag 411a of the mapping information 411 of the first region to 1, in relation to information relating to the first region (region 1) 411 in mapping information stored (or to be stored) in the volatile memory 400. The mapping information 411 of the first region is currently stored (indicated by solid lines) in the volatile memory 400, and the processor 210 may thus configure the update flag 411b (need_update flag) of the mapping information 411 of the first region to 1, in relation to the information relating to the first region in the mapping information stored in the volatile memory 400. The value of the update flag 411b of the mapping information 411 of the first region being 0 may indicate that the mapping information 411 of the first region does not need to be updated from the NAND flash memory 310 (non-volatile memory) of the storage 300 to the volatile memory 400.

The processor 210 according to various embodiments may identify a physical address mapped to the logical address of the data 444b by using the mapping information 411 of the specific region stored in the volatile memory 400. For example, the processor 210 may identify that the physical address mapped to a logical address "2" of the data 444b is 7, based on the mapping information 411 of the first region stored in the volatile memory 400.

In operation ④, the processor 210 according to various embodiments may execute the storage driver 450 so as to transmit the data reading request including the physical address of the data to the storage host controller 220. For example, the mapping information 411 of the first region is stored in the volatile memory 400, and the processor 210 may thus identify the physical address of the specific data 444b by using the information stored in the volatile memory 400. The processor 210 may transmit the data reading request including the physical address of the specific information to the storage host controller 220. For example, the data reading request including a physical address "7" of the specific data may be transmitted to the storage host controller 220.

In operation ⑤, the processor 210 according to various embodiments may transmit the data reading request including the physical address of the data to the storage 300 via the storage host controller 220.

The storage 300 according to various embodiments may process, in operation ⑥ under control of the storage controller 330, the request for reading the data by accessing the physical address of the data, which is identified in a physical NAND cell.

Figure 8:
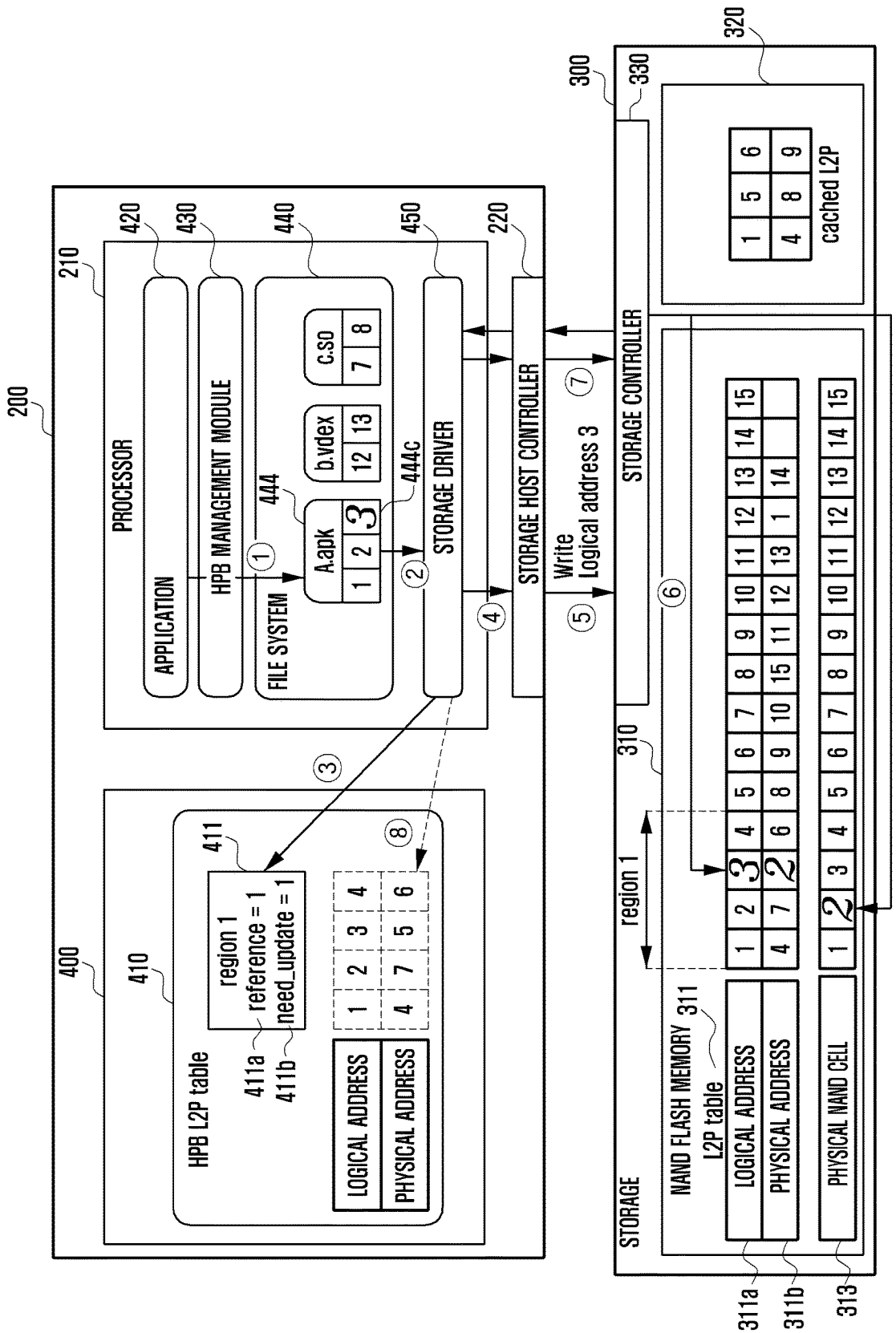
FIG. 8 is a block diagram of an electronic device, illustrating a procedure in which the electronic device processes a request for writing data according to an embodiment of the disclosure.

FIG. 8 is a block diagram of an electronic device, illustrating a procedure in which the electronic device processes a request for writing data according to an embodiment of the disclosure.

Referring to FIG. 8, in operation ①, the processor 210 according to various embodiments may identify generation of a request (data write I/O request) for writing data included in a specific file, in order to update an application 420 during execution of the application 420. The processor 210 according to various embodiments may identify a type of the generated request for data, and may identify that the generated request for data is a request for writing data. The processor 210 according to various embodiments may identify, via the file system 440, a logical address of the data in the specific file, for which the data writing request has been generated. For example, the processor 210 may identify that a writing request has been generated for the data 444c corresponding to a logical address of 3 among data included in the A.apk file 444.

The processor 210 according to various embodiments may identify, in operation ② via the file system 440, information on the specific file 444, for which the data writing request has been generated.

According to various embodiments, the processor 210 may determine, based on information of the file, whether mapping information of a region (e.g., a first region) corresponding to the data of the file is a file managed by the HPB L2P table 410 stored in the volatile memory 400.

According to various embodiments, the processor 210 may determine whether mapping information of a region corresponding to the data included in the specific file, for which the request has been generated, is designated to be managed in the volatile memory 400 of the host end, by referring to the file extension table 441, the file name table 443, and/or the application information table 445 via the file system 440.

The processor 210 according to various embodiments may determine whether the data of the file is maintained/managed by the L2P mapping table 410 stored in the volatile memory 400 of the host 200 end, according to whether the information of the specific file corresponds to at least one in the lists of designated tables, for example, the file extension table 441, the file name table 443, and/or the application information table 445. The processor 210 may identify, for example, application information including a name of an application which is executed using the specific file 444, uses the specific file 444 during execution, or is executed to load the specific file 444. The processor 210 may identify, for example, name, extension, and attribute information of the specific file 444.

The processor 210 according to various embodiments may configure a flag for the generated data writing request, based on the identified information of the file. For example, the processor 210 may configure a flag for the generated data writing request in response to the specific file 444 being a file corresponding to at least one in lists of designated tables.

The processor 210 according to various embodiments may determine, in operation ③, whether a flag has been configured for the generated data writing request and whether the mapping information (HPB L2P table) of the specific region, which includes the logical address of the data, is stored in the volatile memory 400 (first volatile memory). The mapping information 411 of a first region (region 1) illustrated by dotted lines in the volatile memory 400 may indicate mapping information to be updated later from the NAND flash memory 310. It is assumed that the specific region of the mapping information including the specific data is the first region (region 1). Since a flag is currently configured for the generated data writing request, the processor 210 may determine that the mapping information 411 of the specific region including the data is managed in the volatile memory 400 of the host 200 end. The processor 210 may configure the reference flag 411a of the mapping information 411 of the first region to 1, in relation to information relating to the first region (region 1) in mapping information stored (or to be stored) in the volatile memory 400.

The processor 210 according to various embodiments may determine that, since the generated data request is a data writing request, the mapping information 411 of the first region in the current volatile memory 400 is to be changed later (indicated by dotted lines), and the processor 210 may configure the update flag 411b (need_update flag) of the mapping information 411 of the first region to 1, in relation to information relating to the mapping information 411 of the first region in the mapping information stored (or to be stored) in the volatile memory 400. The value of the update flag 411b of the mapping information 411 of the first region (region 1) may indicate that the mapping information 411 of the first region needs to be updated from the NAND flash memory 310 (non-volatile memory) of the storage 300 to the volatile memory 400.

In operation ④, the processor 210 according to various embodiments may execute the storage driver 450 so as to transmit the data writing request including the logical address of the data to the storage host controller 220. For example, the data writing request including a logical address "3" of the specific data may be transmitted to the storage host controller 220.

In operation ⑤, the processor 210 according to various embodiments may transmit the data writing request including the logical address of the data to the storage 300 via the storage host controller 220.

The storage controller 330 according to various embodiments may perform the data writing request for the logical address, in the NAND flash memory 310 (non-volatile memory) in operation ⑥. For example, the storage controller 330 may identify that a physical address corresponding to the logical address of 3 has been changed to 2 in the mapping information 311 within the NAND flash memory 310 due to the data writing request.

The processor 210 according to various embodiments may transmit, in operation ⑦, an update request for mapping information of a specific region in the volatile memory 400 to the storage 300 by executing the storage 300 driver 215. For example, the update flag 411b for the mapping information 411 of the first region in the volatile memory 400 is configured to 1, and the processor 210 may thus transmit the update request for the mapping information 411 of the first region to the storage 300. The storage 300 according to various embodiments may extract the mapping information of the first region from the NAND flash memory 310 and transmit the same to the processor 210, in response to reception of the update request.

The processor 210 according to various embodiments may, in operation ⑧, receive the mapping information of the specific region from the storage 300 and store the same in the volatile memory 400. The mapping information 411 of the first region illustrated by dotted lines in the volatile memory 400 may indicate being loaded into the volatile memory 400 via operation ⑧. When the update of the mapping information 411 of the specific region is completed, the processor 210 according to various embodiments may change, to 0, the update flag 411b (need_update flag) of the mapping information 411 of the first region stored in the volatile memory 400. The value of the update flag 411b of the mapping information 411 of the first region being 0 may indicate that the mapping information 411 of the first region stored in the volatile memory 400 does not need to be updated.

According to various embodiments, operation ⑦ and operation ⑧, which are operations of updating the mapping information of the specific region, may be performed in response to completion of processing the data writing request, and may be performed in response to no data request currently being processed due to completion of all the processing of the data request.

Figure 9:
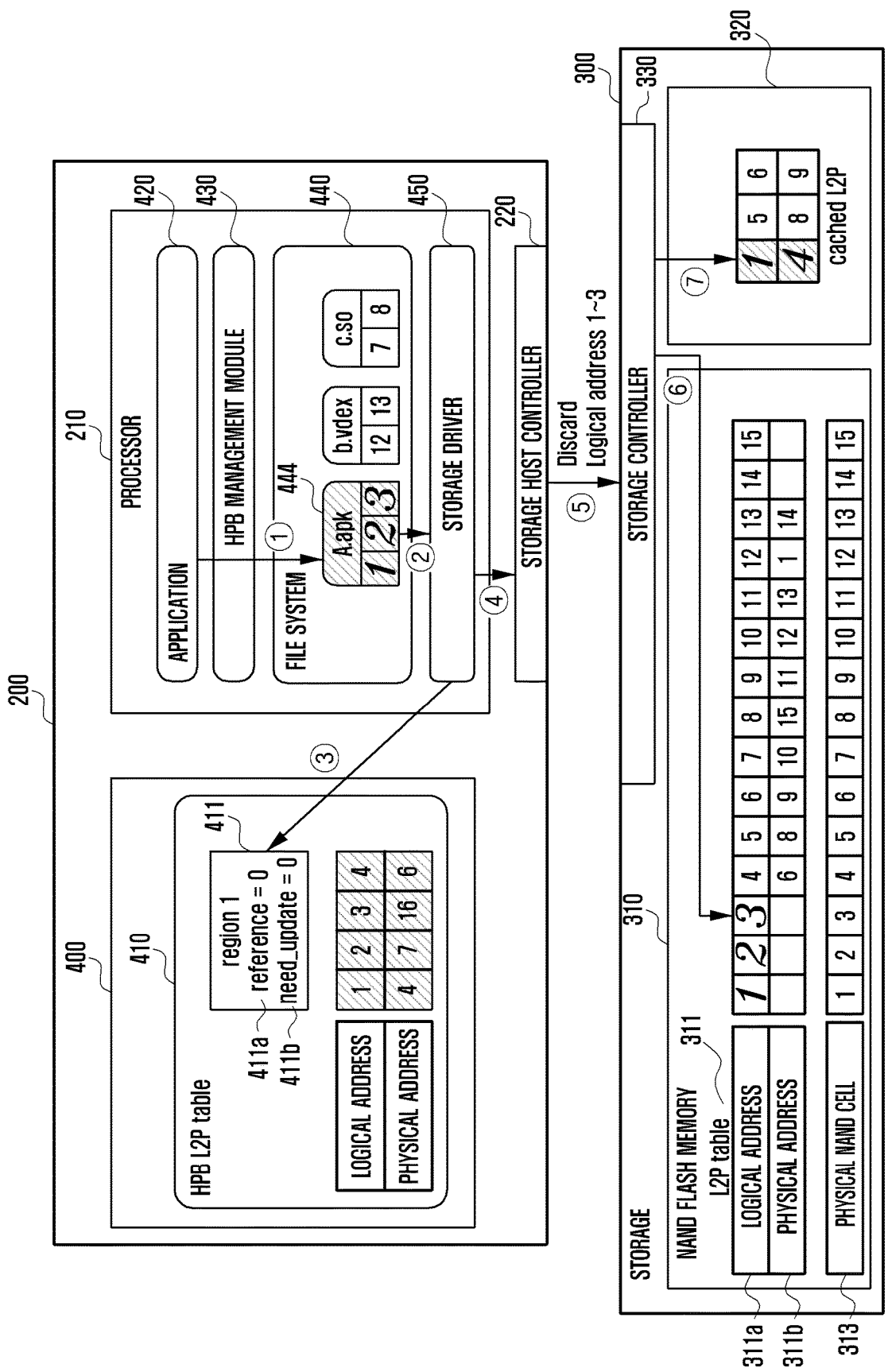
FIG. 9 is a block diagram of an electronic device, illustrating a procedure in which the electronic device processes a request for deleting data according to an embodiment of the disclosure.

FIG. 9 is a block diagram of an electronic device, illustrating a procedure in which the electronic device processes a request for deleting data according to an embodiment of the disclosure.

Referring to FIG. 9, in operation ①, the processor 210 according to various embodiments may identify generation of a request (data delete I/O request or data discard I/O request) for deleting a specific file. The processor 210 according to various embodiments may identify a type of the generated request for data (e.g., a reading/writing/deleting request), and may identify that the generated request for data is a request for deleting data. The processor 210 according to various embodiments may identify, via the file system 440, a logical address of the data in the specific file, for which the data deleting request has been generated. For example, in order to delete the A.apk file 444, the processor 210 may identify generation of a request for deleting data corresponding to logical addresses of 1 to 3 included in the A.apk file 444.

The processor 210 according to various embodiments may identify, in operation ②, via the file system 440, information on the specific file 444, for which the data deleting request has been generated.

When a request for data included in a specific file is generated, the processor 210 according to various embodiments may determine, based on information of the file, whether mapping information of a region (e.g., a first region) corresponding to the data of the file is a file managed by the HPB L2P table 410 stored in the volatile memory 400.

According to various embodiments, the processor 210 may determine whether mapping information of a region corresponding to the data included in the specific file, for which the request has been generated, is designated to be managed in the volatile memory 400 of the host end, by referring to the file extension table 441, the file name table 443, and/or the application information table 445 via the file system 440.

The processor 210 according to various embodiments may determine whether the data of the file is maintained/managed by the L2P mapping table 410 stored in the volatile memory 400 of the host 200 end, according to whether the information of the specific file corresponds to at least one in the lists of designated tables, for example, the file extension table 441, the file name table 443, and/or the application information table 445.

The processor 210 according to various embodiments may configure a flag for the generated data deleting request, based on the identified information of the file.

The processor 210 according to various embodiments may determine, in operation ③, that mapping information of a specific region, which includes the data, is not managed in the volatile memory 400 of the host end, in response to the generated data request being a data deleting request. The processor 210 may configure the reference flag 411a of the mapping information 411 of the first region to 0, in relation to information relating to the first region (region 1) in the mapping table 410 stored in the volatile memory 400. The processor 210 according to various embodiments may configure, to 0, the update flag 411b (need_update flag) of the mapping information 411 of the first region, in response to the generated data request being a data deleting request. The processor 210 according to various embodiments may delete (or unload) the mapping information 411 of the specific region from the volatile memory 400. The mapping information 411 of the specific region indicated by hatching, stored in the volatile memory 400, may indicate mapping information to be deleted later.

In operation ④, the processor 210 according to various embodiments may execute the storage driver 450 so as to transmit the data deleting request including the logical address of the data to the storage host controller 220. For example, the data deleting request including the logical addresses, 1 to 3, of the data may be transmitted to the storage host controller 220.

In operation ⑤, the processor 210 according to various embodiments may transmit the data deleting request including the logical address of the data to the storage 300 via the storage host controller 220.

The storage controller 330 according to various embodiments may process, in operation ⑥, the data deleting request in the NAND flash memory 310 (non-volatile memory). For example, the storage controller 330 may delete physical addresses mapped to the logical addresses, 1 to 3, of the data.

According to various embodiments, the storage controller 330 may process, in operation ⑦, the request for deleting the data from the cache 320. For example, the storage controller 330 may delete the physical addresses mapped to the logical addresses, 1 to 3, of the data from the cache 320.

Figure 10:
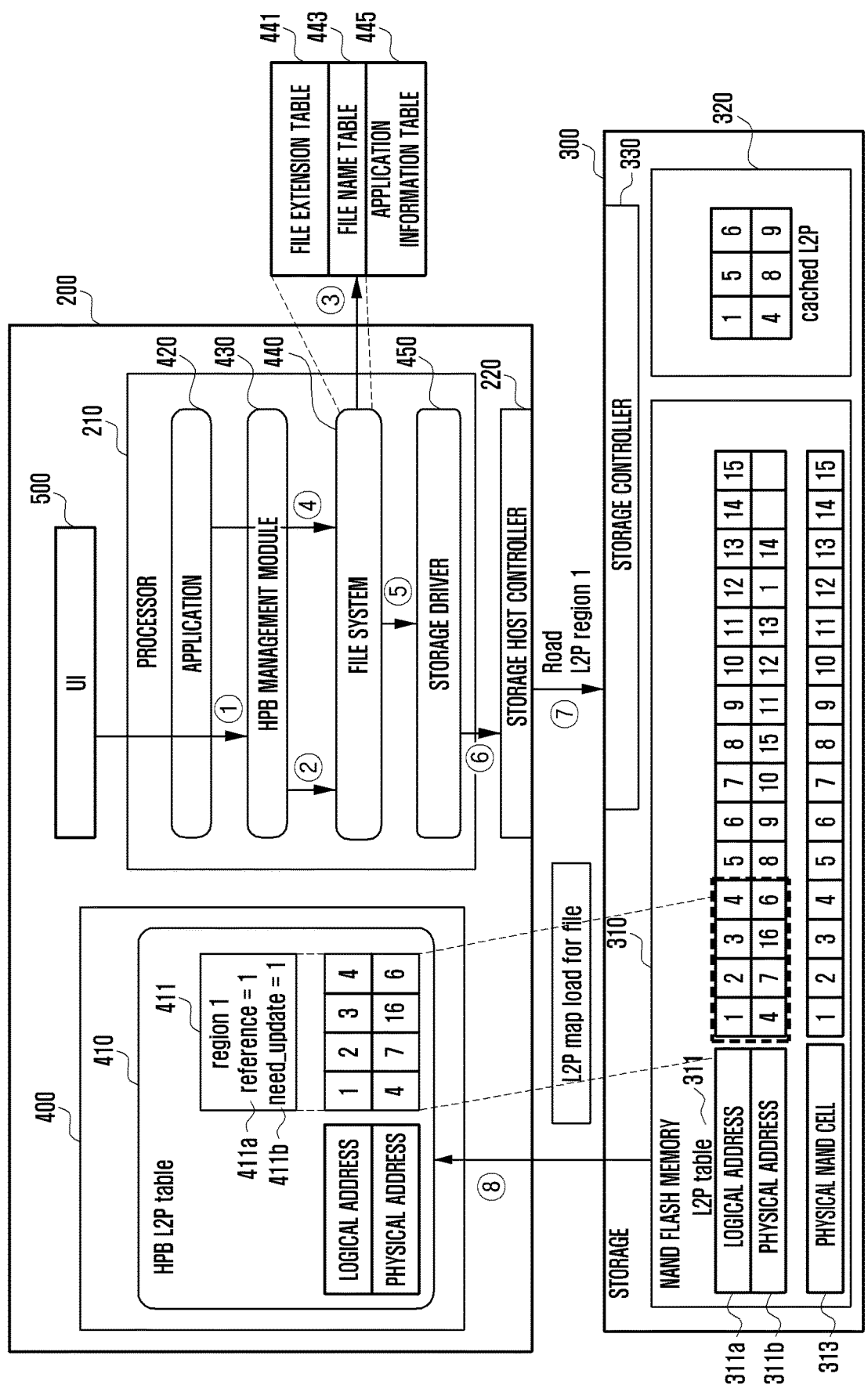
FIG. 10 is a block diagram of an electronic device, illustrating that the electronic device performs an HPB table list adding procedure according to an HPB function configuration according to an embodiment of the disclosure.

FIG. 10 is a block diagram of an electronic device, illustrating that the electronic device performs an HPB table list adding procedure according to an HPB function configuration according to an embodiment of the disclosure.

Referring to FIG. 10, an electronic device (e.g., the electronic device 101 of FIG. 1) according to various embodiments may include the storage 300 and the host 200 including the application processor 210 and the volatile memory 400. Contents overlapping with those described above will be omitted.

The processor 210 according to various embodiments may execute various software (e.g., the program 140). The processor 210 may, for example, call one or more instructions from software including one or more instructions stored in the memory 400 (e.g., the volatile memory 132 of FIG. 1), and may execute the application 420 (e.g., the application 420 of FIG. 4), the HPB management module 430 (e.g., the HPB management module 430 of FIG. 4), the file system 440 (e.g., the file system 440 in FIG. 4), and/or the storage driver 450 (e.g., the storage driver 450 in FIG. 4).

In operation ①, the processor 210 according to various embodiments may control the HPB management module 430 to receive HPB function configuration information input via a user interface 500 (e.g., the input module 150 of FIG. 1) and may enable configuration of information on a designated application and/or file, based on the received HPB function configuration information. According to another embodiment, the HPB management module 430 may configure information on the designated application and/or file, based on application and/or file lists relating to a recent frequency of use or application and/or file lists relating to a highest frequency of use.

The processor 210 according to various embodiments may cause information on the selected application and/or file to be transferred to the file system 440 in operation ②, and may cause information table lists of the file system 440 to be generated, updated, and/or deleted in operation 3). The file system 440 according to various embodiments may generate, update, and/or delete, for example, the lists of the file extension table 441, the file name table 443, and/or the application information table 445, based on the information on the designated application and/or file, received from the HPB management module 212.

The processor 210 according to various embodiments may, if the storage 300 supports the HPB function, load mapping information (HPB L2P table) of a specific region from the storage 300 into the volatile memory 400, based on information stored in the lists of the tables of the file system 440, for example, the file extension table 441, the file name table 443, and/or the application information table 445, and may manage the mapping table 410 of the specific region stored in the volatile memory 400.

The processor 210 according to various embodiments may, in operation 4), identify generation of a request (data I/O request) for reading, writing, or deleting data included in a specific file according to execution of a specific application (e.g., YouTube) and determine, via the file system 440, whether the application and/or specific file, for which the request has been generated, correspond to the designated application and/or file. The processor 210 may determine whether the application and/or specific file, for which the request has been generated, are included, for example, in the lists of the tables of the file system 440, such as the extension table 441, the file name table 443, and/or the application information table 445.

According to various embodiments, if the executed application and/or specific file correspond to the designated application and/or file, the processor 210 may configure a flag for the request for the data of the corresponding file, and may identify, generate, or update the mapping table (HPB L2P mapping table) 410 stored in the volatile memory 400, based on whether a flag has been configured for the data request and the type of the data request.

According to various embodiments, in operation ⑤, the processor 210 may execute the storage driver 450 so as to transmit the data reading or deleting request including the physical address of the data to the storage host controller 220. The processor 210 may determine whether a flag has been configured for the data request and may identify the physical address corresponding to the logical address of the data from the mapping table (HPB L2P mapping table) 410 stored in the volatile memory 400, based on the type of the data request.

According to various embodiments, the processor 210 has determined that a flag is configured for the data request, but if it is determined that information on the data does not exist in the mapping table (HPB L2P mapping table) 410 stored in the volatile memory 400, the storage driver 450 may be executed in operation ⑥, and an update request for the mapping information 411 of the specific region in the volatile memory 400 may be transmitted to the storage 300 via the storage host controller 220 in operation ⑦. For example, the update flag 411b for the mapping information 411 of the first region in the volatile memory 400 is configured to 1, and the processor 210 may thus transmit a loading request for the mapping information 411 of the first region to the storage 300. The storage 300 according to various embodiments may, in operation 8, extract the mapping information 411 of the first region and transmit the same to the processor 210, in response to reception of the loading request.

Figure 11A:
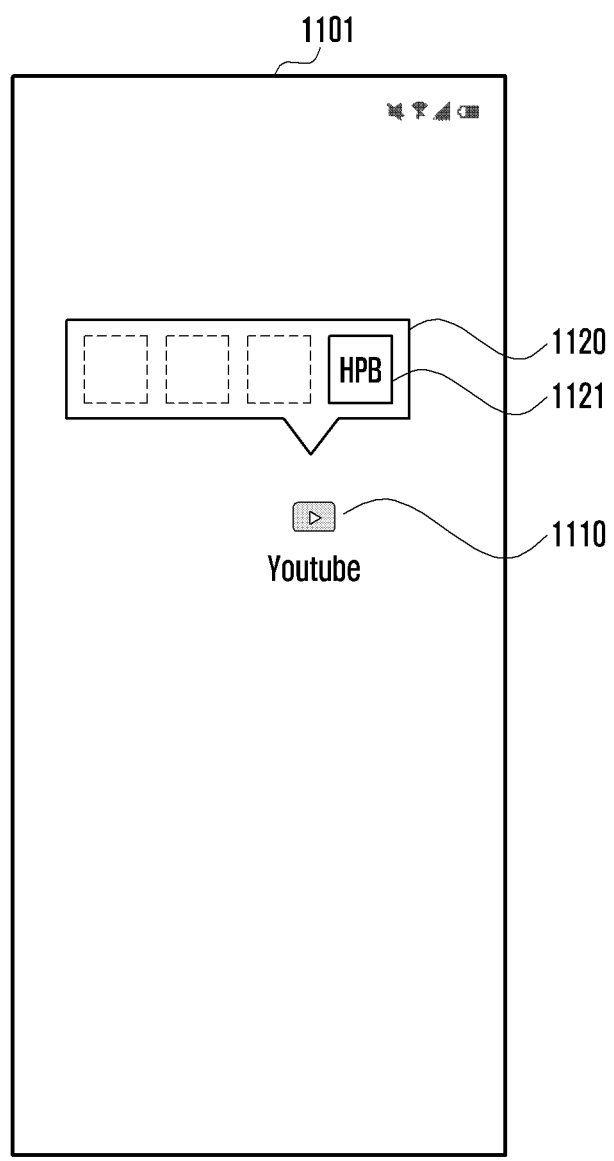
FIGS. 11A and 11B are examples of a user interface for configuration of an HPB function in an electronic device according to various embodiments of the disclosure.
Figure 11B:
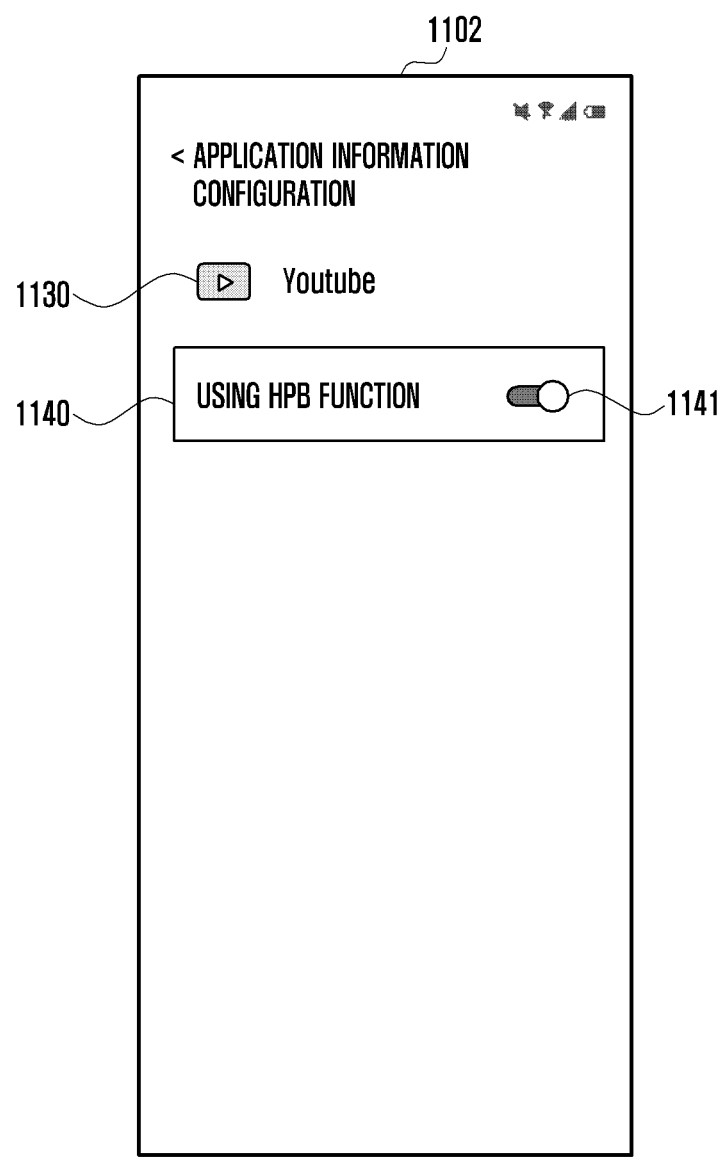

FIGS. 11A and 11B are examples of a user interface for configuration of an HPB function in an electronic device according to various embodiments of the disclosure.

Referring to FIG. 11A, the processor 210 according to various embodiments may, in response to selection (e.g., a touch input) of an icon 1110 of a specific application (e.g., YouTube) via a screen 1101 of a display (e.g., the display module 160 of FIG. 1), provide an HPB function configuration menu icon 1121 for the corresponding application in the form of, for example, a pop-up window 1120. If the HPB function is configured for the specific application, the processor 210 may control the HPB management module 212 so as to enable configuration of application and/or file information according to an HPB function configuration for the application.

Referring to FIG. 11B, the processor 210 according to various embodiments may enter an information configuration menu 1140 of the specific application 1130 (e.g., YouTube) via a screen 1102 of the display, and may select an HPB function configuration menu icon 1141 for the application, thereby configuring the HPB function or canceling configuration of the same. If the HPB function is configured for the specific application, the processor 210 may control the HPB management module 212 so as to enable configuration of application and/or file information according to the HPB function configuration for the application.

Figure 12:
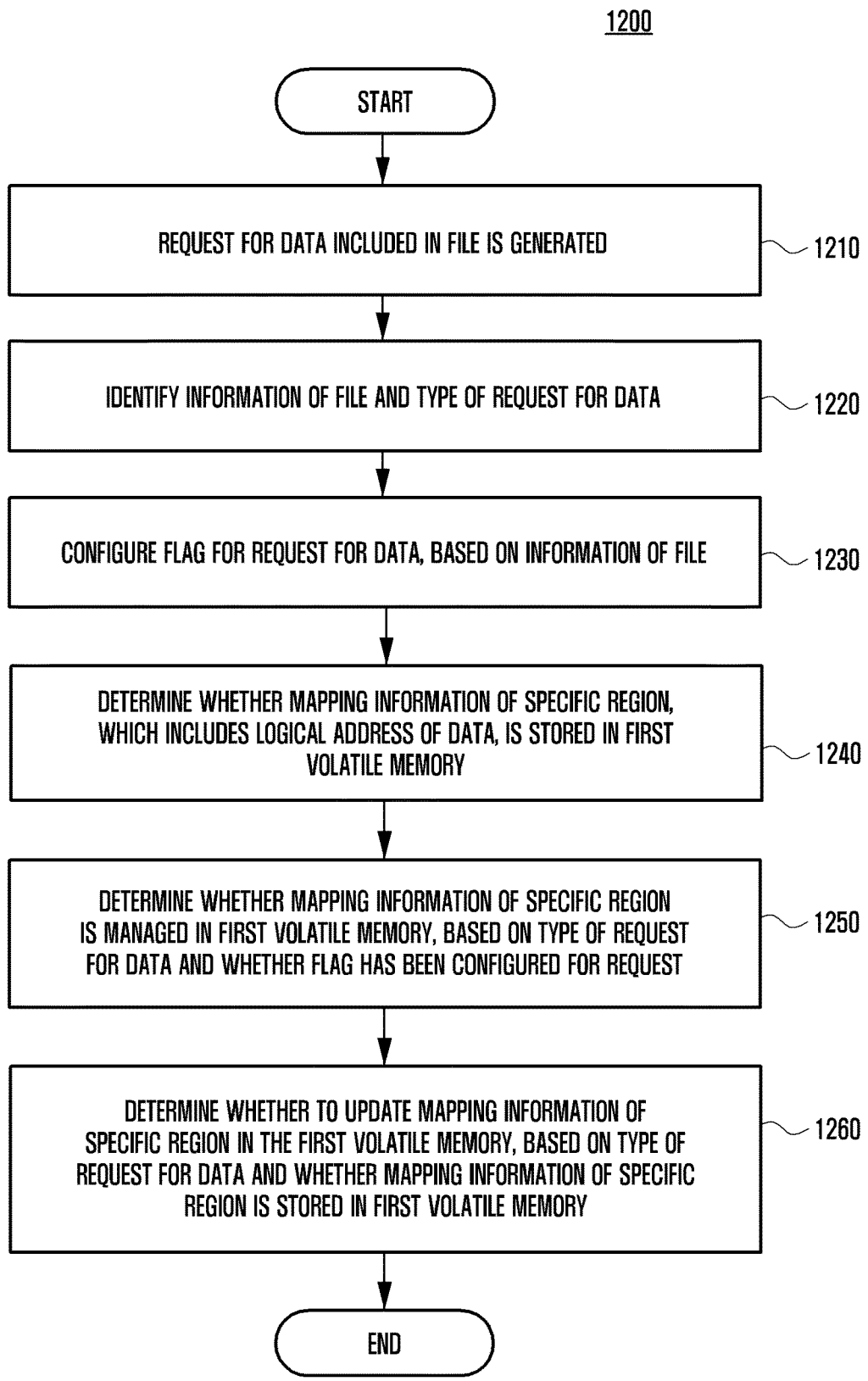
FIG. 12 is an operation flowchart of an electronic device according to an embodiment of the disclosure.

FIG. 12 is an operation flowchart of an electronic device according to an embodiment of the disclosure.

Referring to FIG. 12, an operation flowchart 1200, the processor 210 (e.g., the file system 440 of FIG. 4) according to various embodiments may identify, in operation 1210, generation of a request for data included in a specific file.

In operation 1220, the processor 210 (e.g., the file system 440 of FIG. 4) according to various embodiments may identify, in response to the generation of the request for the data included in the specific file, information of the specific file and a type of the request for the data.

When the request for the data included in the specific file is generated, the processor 210 according to various embodiments may determine, based on information of the file, whether mapping information of a region (e.g., a first region) corresponding to the data of the file is a file managed by the HPB L2P table 410 stored in the volatile memory 400.

According to various embodiments, the processor 210 may determine whether mapping information of a region corresponding to the data included in the specific file, for which the request has been generated, is designated to be managed in the volatile memory 400 of the host end, by referring to the file extension table 441, the file name table 443, and/or the application information table 445 via the file system 440.

The processor 210 according to various embodiments may determine whether the data of the file is maintained/managed by the L2P mapping table 410 stored in the volatile memory 400 of the host 200 end, according to whether the information of the specific file corresponds to at least one in the lists of designated tables, for example, the file extension table 441, the file name table 443, and/or the application information table 445.

According to an embodiment, the processor 210 may determine, for example, whether application information related to the specific file is stored in the application information table 445. The processor 210 may determine, for example, whether a name of the specific file 444 is stored in the file name table 443. The processor 210 may determine, for example, whether an extension of the specific file 444 is stored in the file extension table 441.

For example, the processor 210 may determine whether the generated request for the data is a reading request, a writing request, or a deleting request.

The processor 210 (e.g., the file system 440 of FIG. 4) according to various embodiments may configure, in operation 1230, a flag for the generated request for the data, based on the identified information of the specific file. For example, in response to determining that the specific file is a file corresponding to at least one among lists of the tables 441, 443, and/or 445, the processor 210 may configure a flag for the generated request for the data. For example, if the file corresponds to a predesignated file on the basis of information of the specific file, the processor 210 may determine whether mapping information of a specific region, which correspond to the data, is a file managed in a first volatile memory (e.g., the volatile memory 400 of FIG. 4) of the host 200 end, and may configure a flag for the request for the data in response to determining that the mapping information is the file managed in the first volatile memory (e.g., the volatile memory 400 of FIG. 4).

In operation 1240, the processor 210 (e.g., the storage driver 450) according to various embodiments may determine whether the mapping information of the specific region, which includes a logical address of the data, is stored in the first volatile memory (e.g., the volatile memory 400 of FIG. 4). For example, it may be determined whether the first volatile memory (e.g., the volatile memory 400 of FIG. 4) stores the mapping information of the specific region, which includes the logical address of the data, in mapping information (e.g., the L2P mapping information 311 in the NAND flash memory 310 of FIG. 4) for mapping of logical addresses and physical addresses for a non-volatile memory (e.g., the NAND flash memory 310 of FIG. 4) of the storage 300.

The processor 210 (e.g., the storage driver 450) according to various embodiments may determine, in operation 1250, whether the mapping information of the specific region is managed in the first volatile memory (e.g., the volatile memory 400 of FIG. 4), based on the identified type of the data request and whether a flag has been configured for the data request. For example, if the identified type of the data request is a request for reading data and a flag has been configured for the data request, the processor 210 may determine that the mapping information of the specific region is managed in the first volatile memory (e.g., the volatile memory 400 of FIG. 4). For example, if the identified type of the data request is a request for writing data and a flag has been configured for the data request, the processor 210 may determine that the mapping information of the specific region is managed in the first volatile memory (e.g., the volatile memory 400 of FIG. 4). For example, if the identified type of the data request is a request for deleting data, the processor 210 may determine that the mapping information of the specific region is not managed in the first volatile memory (e.g., the volatile memory 400 of FIG. 4).

The processor 210 (e.g., the storage driver 450) according to various embodiments may configure the reference flag 411a for the specific region in the first volatile memory (e.g., the volatile memory 400 of FIG. 4), in response to determining that the mapping information of the specific region is managed in the first volatile memory (e.g., the volatile memory 400 of FIG. 4). The processor 210 may configure, for example, the reference flag 411a for the specific region in the first volatile memory (e.g., the volatile memory 400 of FIG. 4) to 0, in response to determining that the mapping information of the specific region is not managed in the first volatile memory (e.g., the volatile memory 400 of FIG. 4).

The processor 210 (e.g., the storage driver 450) according to various embodiments may determine, in operation 1260, whether to update the mapping information of the specific region in the first volatile memory (e.g., the volatile memory 400 of FIG. 4), based on the identified type of the data request and whether the identified mapping information of the specific region is stored in the first volatile memory (e.g., the volatile memory 400 of FIG. 4).

For example, the processor 210 may determine that there is no need to update the mapping information of the specific region in the first volatile memory (e.g., the volatile memory 400 of FIG. 4), based on that the identified data request is a request for reading data, and the mapping information of the specific region is stored in the first volatile memory (e.g., the volatile memory 400 of FIG. 4).

For example, the processor 210 may determine that the mapping information of the specific region in the first volatile memory (e.g., the volatile memory 400 of FIG. 4) needs to be updated, based on that the identified data request is a request for reading data, and the mapping information of the specific region is not stored in the first volatile memory (e.g., the volatile memory 400 of FIG. 4).

For example, if the identified data request is a request for writing data, the processor 210 may determine that the mapping information of the specific region in the first volatile memory (e.g., the volatile memory 400 of FIG. 4) needs to be updated.

For example, if the identified data request is a request for deleting data, the processor 210 may determine that there is no need to update the mapping information of the specific region in the first volatile memory (e.g., the volatile memory 400 of FIG. 4).

The processor 210 according to various embodiments may configure the update flag 411*b* for the specific region in the first volatile memory (e.g., the volatile memory 400 of FIG. 4) to 1, in response to determining that the mapping information of the specific region needs to be updated. The processor 210 may configure, for example, the update flag 411*b* for the specific region in the first volatile memory (e.g., the volatile memory 400 of FIG. 4) to 0, in response to determining that there is no need to update the mapping information of the specific region.

Figure 13:
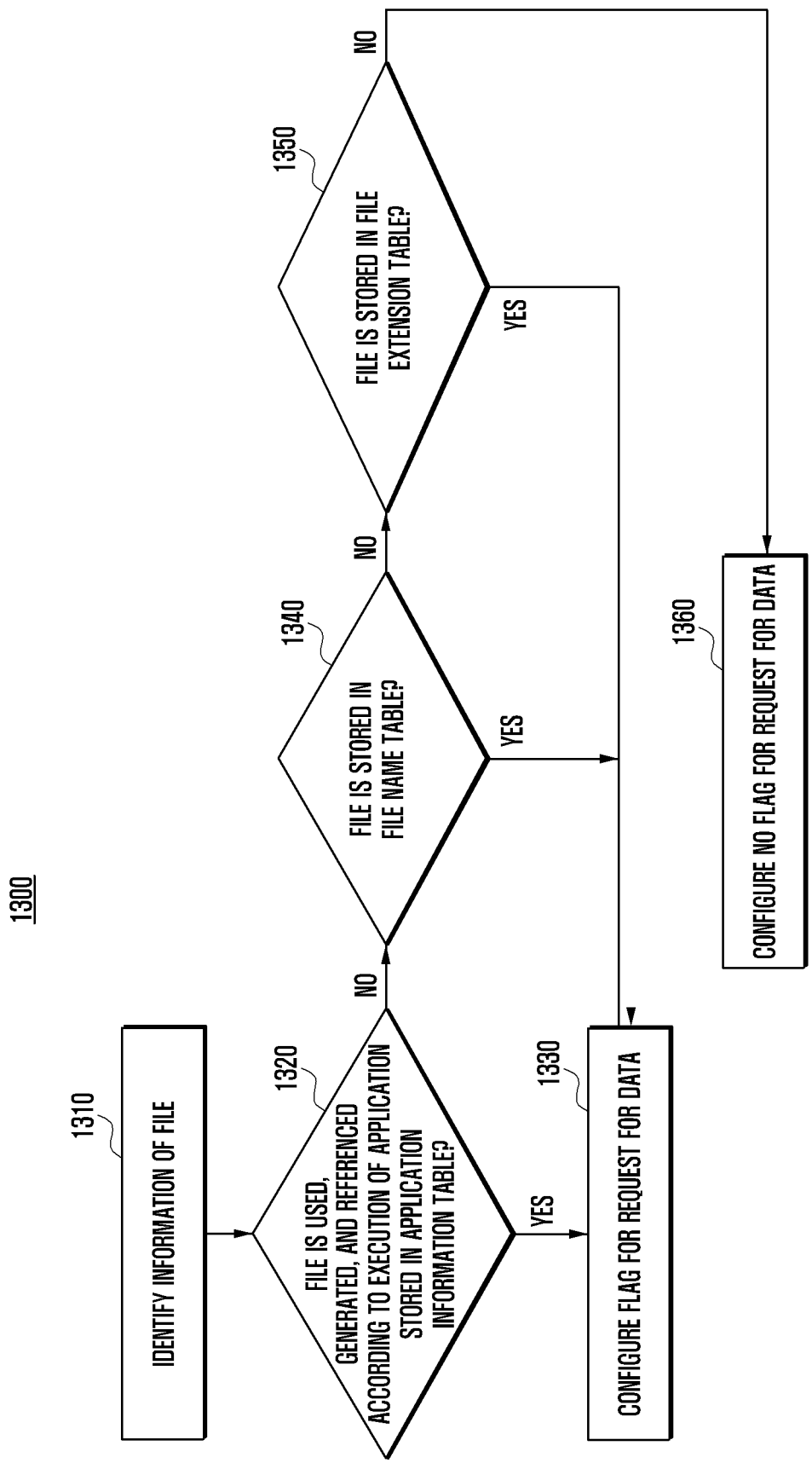
FIG. 13 is an operation flowchart of an electronic device according to an embodiment of the disclosure.

FIG. 13 is an operation flowchart of an electronic device according to an embodiment of the disclosure.

An operation flowchart 1300 is an operation flowchart illustrating specific operations for operation 1220 and operation 1230 of FIG. 13.

Referring to FIG. 13, the operation flowchart 1300, the processor 210 (e.g., the file system 440 of FIG. 4) according to various embodiments may identify information of a specific file, in operation 1310, in response to generation of a request for data included in the specific file.

In operation 1320, the processor 210 according to various embodiments may determine, as a result of the identification, whether the specific file is a file used, generated, or referenced according to execution of a specific application stored in the application information table 445 of the file system 440. For example, the processor 210 may identify name, extension, and attribute information of the specific file so as to determine whether the specific file is used according to execution of the specific application or generated or referenced according to the execution. If it is determined that the specific file is a file used, generated, or referenced according to execution of the specific application, the processor 210 may configure, by branching to operation 1330 (1320-YES), a flag for the data request.

If it is determined that the specific file is not a file used, generated, or referenced according to execution of the specific application, the processor 210 may determine, by branching to operation 1340 (1320-NO), whether the specific file is a file stored in the file name table 443.

As a result of the determination, in response to the specific file being included in the file list stored in the file name table 443, the processor 210 may configure, by branching to operation 1330 (1340-YES), a flag for the data request.

If it is determined that the specific file is not included in the file list stored in the file name table 443, the processor 210 may determine, by branching to operation 1350 (1340-NO), whether the specific file is a file with a file extension stored in the file extension table 441.

As a result of the determination, in response to the specific file being a file with the file extension stored in the file extension table 441, the processor 210 may configure, by branching to operation 1330 (1350-YES), a flag for the data request.

As a result of the determination, in response to the specific file not being a file with the file extension stored in the file extension table 441, the processor 210 may not configure, by branching to operation 1360 (1350-NO), a flag for the data request.

Figure 14A:
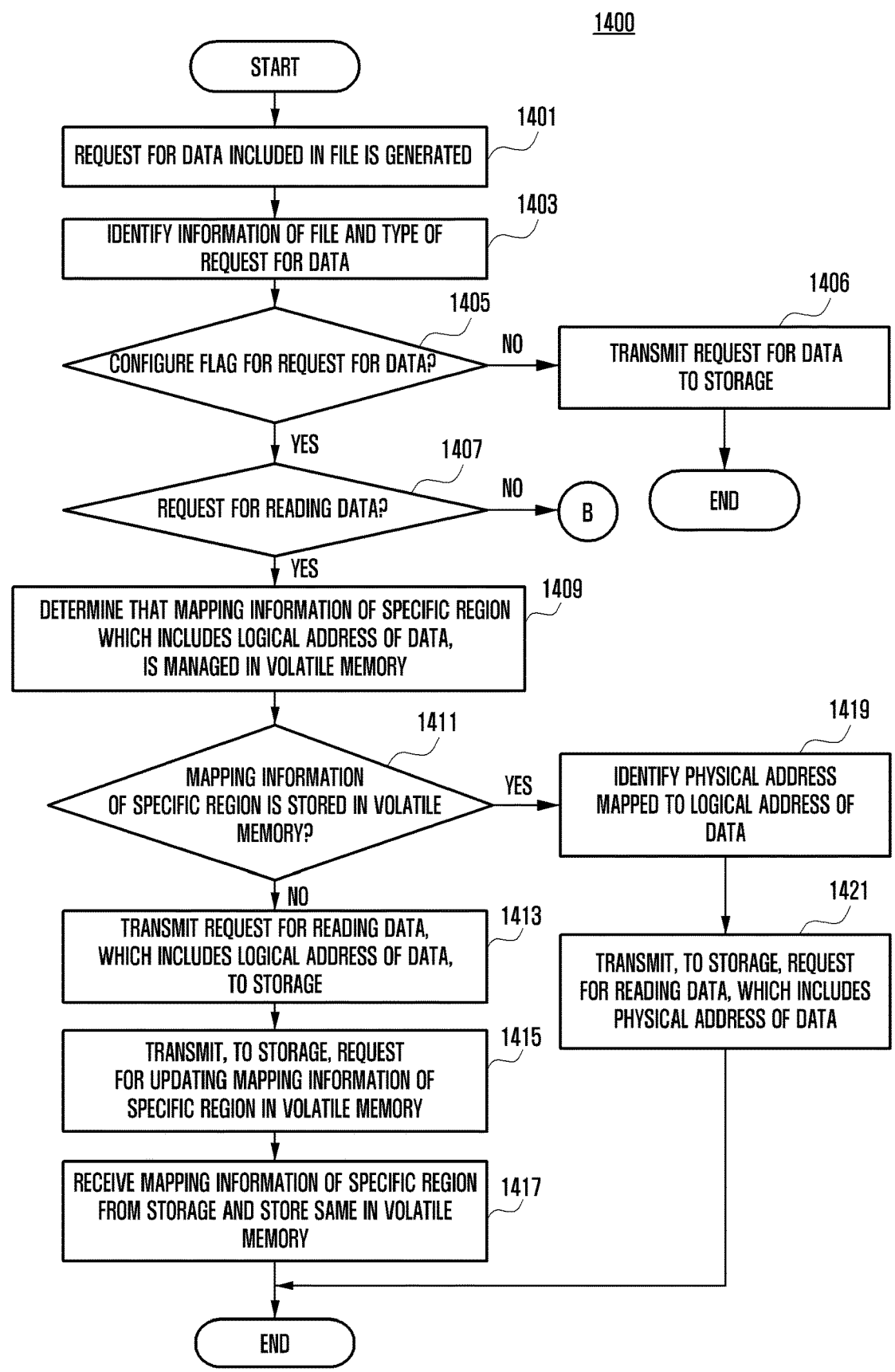
FIGS. 14A and 14B are operation flowcharts of an electronic device according to various embodiments of the disclosure.
Figure 14B:
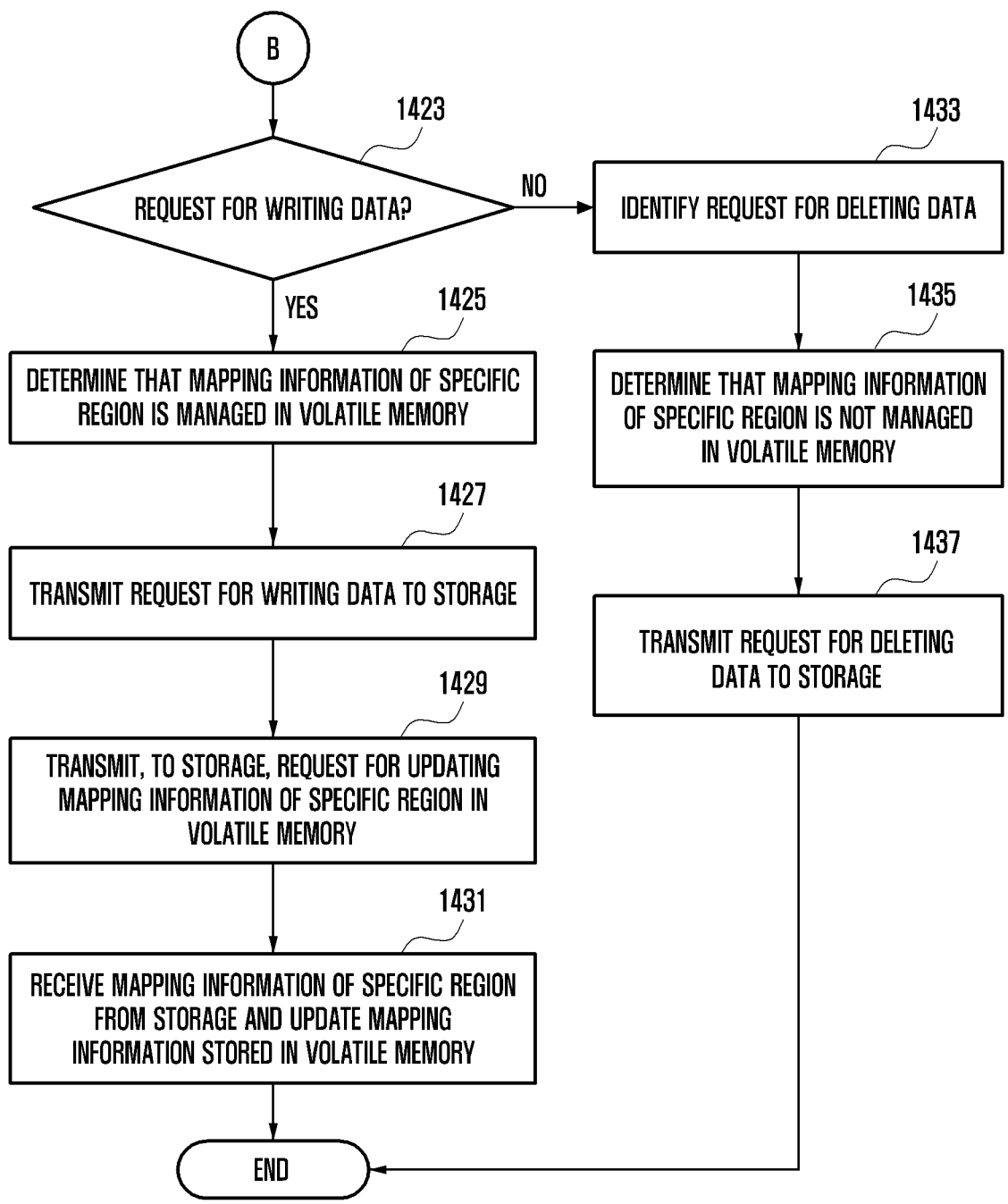

FIGS. 14A and 14B are operation flowcharts of an electronic device according to various embodiments of the disclosure. Contents overlapping with those described in FIG. 12 and FIG. 13 will be omitted.

Referring to FIG. 14A, an operation flowchart 1400, the processor 210 (e.g., the file system 440 of FIG. 4) according to various embodiments may identify, in operation 1401, generation of a request for data included in a specific file.

The processor 210 according to various embodiments may identify, in operation 1403, information of the specific file and a type of the request for data (e.g., a reading/writing/deleting request).

The processor 210 according to various embodiments may determine, in operation 1405, whether to configure a flag for the request, based on the identified information of the specific file. The processor 210 may configure a flag for the data request if, for example, the specific file is determined to be a file used, generated, and/or referenced according to execution of a specific application. To this end, the processor 210 may determine whether the specific file is included in lists of tables of a file system (e.g., the file system 440 of FIG. 4), for example, the file extension table 441, the file name table 443, and/or the application information table 445, and if included, a flag may be configured for the data request.

If no flag is configured for the data request, the processor 210 may directly transmit the data request to the storage 300 by branching to operation 1406 (1405-NO).

If a flag has been configured for the data request, the processor 210 may determine whether the data request is a request for reading data, by branching to operation 1407 (1405-YES).

As a result of the determination, if the data request is not a request for reading data, branching may be performed to operation B (1407-NO). Operation B will be described later with reference to FIG. 14B.

As a result of the determination, if the data request is a request for reading data, the processor 210 may determine, by branching to operation 1409 (1407-YES), that mapping information of a specific region, which includes a logical address of the data, is managed in a first volatile memory (e.g., the volatile memory 400 of FIG. 4). For example, if a flag has been configured for the generated data reading request, the processor 120 may determine that the mapping information of the specific region, which includes the logical address of the data, is managed in the first volatile memory (e.g., the volatile memory 400 of FIG. 4).

The processor 210 according to various embodiments may determine, in operation 1411, whether the mapping information of the specific region is stored in the first volatile memory (e.g., the volatile memory 400 of FIG. 4).

As a result of the determination, if the mapping information of the specific region is stored in the first volatile memory (e.g., the volatile memory 400 of FIG. 4), the processor 210 may identify, by branching to operation 1419 (1411-YES), a physical address mapped to the logical address of the data by using the mapping information of the specific region stored in the first volatile memory (e.g., the volatile memory 400 of FIG. 4). The processor 210 according to various embodiments may transmit, in operation 1421, the data reading request including the physical address of the data to the storage 300.

As a result of the determination, if the mapping information of the specific region is not stored in the volatile memory 400, the processor 210 may transmit, by branching to operation 1413 (1411-NO), the data reading request including the logical address of the data to the storage 300.

In operation 1415, the processor 210 according to various embodiments may determine that the mapping information of the specific region in the volatile memory 400 needs to be updated and may transmit, to the storage 300, a request for updating the mapping information of the specific region in the volatile memory 400.

In operation 1417, the processor 210 according to various embodiments may receive the mapping information of the specific region from the storage 300 in response to transmission of the update request, and may store the received mapping information of the specific region in the volatile memory 400.

According to various embodiments, operation 1415 and operation 1417, which are operations of updating the mapping information of the specific region, may be performed in response to completion of processing the data reading request, and may be performed in response to no data request currently being processed due to completion of all the processing of the data request.

Referring to FIG. 14B, the processor 210 (e.g., the file system 440 of FIG. 4) according to various embodiments may determine, by branching from operation B to operation 1423, whether the data request is a request for writing data.

As a result of the determination, if the data request is a request for writing data, the processor 210 may determine, by branching to operation 1425 (1423-YES), that the mapping information of the specific region is managed in the volatile memory 400.

The processor 210 according to various embodiments may transmit, in operation 1427, the data writing request including the logical address of the data to the storage 300.

In operation 1429, in response to the data request being a request for writing data, the processor 210 according to various embodiments may determine that the mapping information of the specific region in the volatile memory 400 needs to be updated and may transmit, to the storage 300, a request for updating the mapping information of the specific region in the volatile memory 400.

In operation 1431, in response to transmission of the request for updating the mapping information of the specific region, the processor 210 according to various embodiments may receive, from the storage 300, the request for updating the mapping information of the specific region, and may store the received mapping information of the specific region in the volatile memory 400 so as to perform update.

As a result of determination, if the data request is not a request for writing data, the processor 210 may determine, by branching to operation 1433 (1423-NO), that the data request is a request for deleting data.

In operation 1435, the processor 210 according to various embodiments may determine that the mapping information of the specific region is not managed in the volatile memory 400, in response to the data request being a request for deleting data.

The processor 210 according to various embodiments may transmit, in operation 1437, the request for deleting data, which includes the logical address of the data, to the storage 300.

According to various embodiments, operation 1429 and operation 1431, which are operations of updating the mapping information of the specific region, may be performed in response to completion of processing the data writing request, and may be performed in response to no data request currently being processed due to completion of all the processing of the data request.

Figure 15:
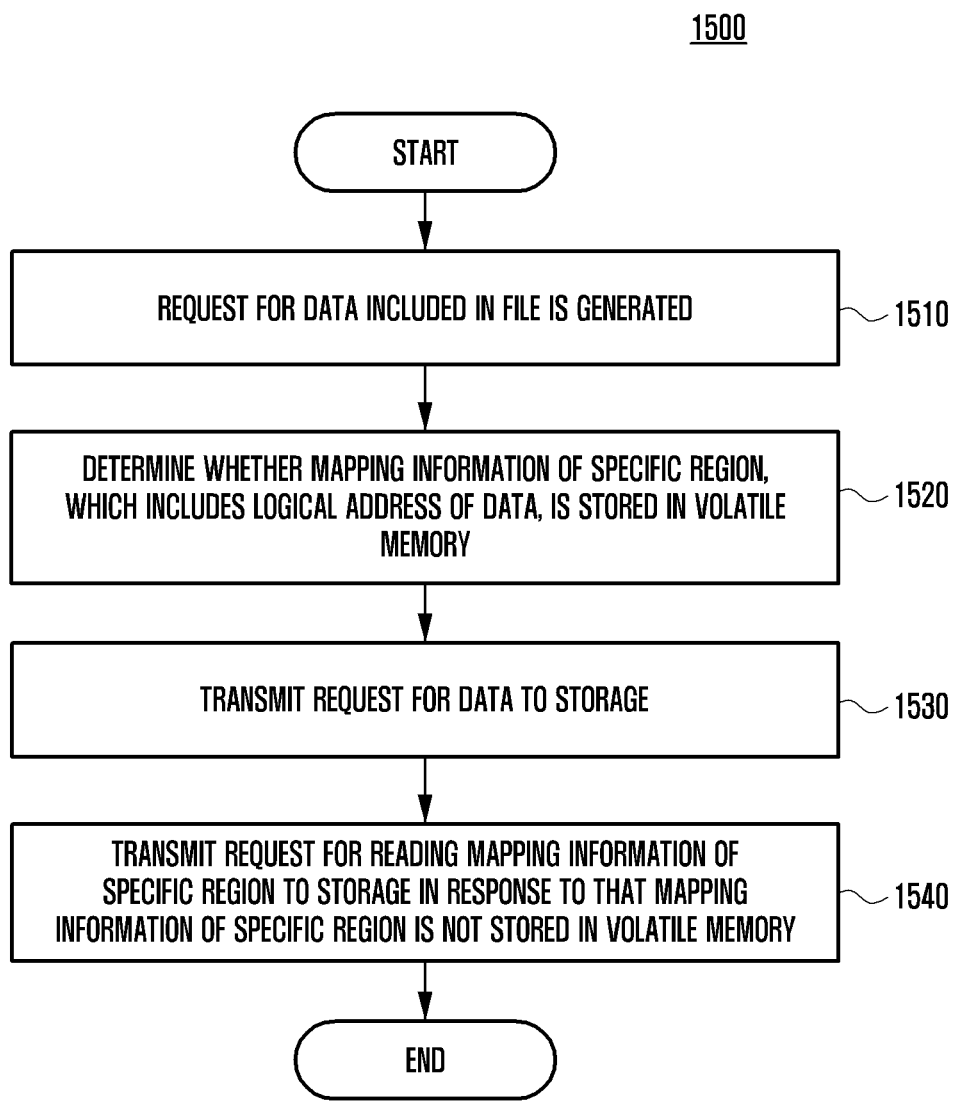
FIG. 15 is an operation flowchart of an electronic device according to an embodiment of the disclosure.

FIG. 15 is an operation flowchart of an electronic device according to an embodiment of the disclosure.

Referring to FIG. 15, an operation flowchart 1500, the processor 210 (e.g., the file system 440 of FIG. 4) according to various embodiments may identify, in operation 1510, generation of a request for data included in a file. The processor 210 according to various embodiments may determine, in operation 1520, whether mapping information of a specific region, which includes a logical address of the data, is stored in the volatile memory 400, in response to the generation of the request for the data included in the file.

The processor 210 according to various embodiments may transmit the data request to the storage 300 in operation 1530. The processor 210 may transmit the data request including the logical address of the data to the storage, in response to, for example, that the mapping information of the specific region is not stored in a first volatile memory. The processor 210 may identify a physical address corresponding to the logical address of the data via the mapping information of the specific region and may transmit the data request including the physical address of the data to the storage 300, in response to, for example, that the mapping information of the specific region is stored in the first volatile memory.

In operation 1540, the processor 210 according to various embodiments may transmit, to the storage 300, the request for reading the mapping information of the specific region, in response to the mapping information of the specific region not being stored in the first volatile memory. In response to reception of the request for reading the mapping information of the specific region, the storage 300 according to various embodiments may identify the mapping information for the specific region from the non-volatile memory (NAND flash memory 310) of the storage 300 so as to transmit the mapping information for the specific region to the processor 210.

According to various embodiments, an HPB function may be configure, based on usability, for frequently used or selected files and/or applications so that the usability of the HPB function may be further increased, and unnecessary resource consumption may be reduced accordingly.

According to various embodiments, limited memory resources may be more efficiently utilized by enabling configuration of the HPB function or cancellation of the configuration with respect to a specific file and/or application.

According to various embodiments, configuration of the HPB function for the specific file and/or application may allow reduction of resource waste and power consumption due to frequent access to a storage according to execution of commands and collection of information for the HPB function configuration for an unspecified file and/or application.

According to various embodiments, configuration of the HPB function in a restricted manner only for the specific file and/or application may enable significant reduction of resources of a volatile memory, which are occupied by an L2P map table, in comparison with a case of configuring the HPB function for an unspecified file and/or application.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a display;
a processor;
a volatile memory; and
a storage comprising a non-volatile memory,
wherein the processor is configured to:
provide on the display a screen comprising an icon of a specific application, a name of the specific application, and an icon menu for selecting configuration information on the specific application,
receive, via a user interface of the screen, the configuration information on the specific application,
based on the configuration information on the specific application, update a designated information table,
in response to identifying a generation of a request for data included in a file, identify information of the file and a type of the request,
based on the identifying of the information of the file, identify whether the information of the file corresponds to a process identifier (ID) and an application name listed in a list of the designated information table of the volatile memory,
in response to identifying that the information of the file corresponds to the process ID and the application name in the list of the designated information table, configure a flag for the request based on the information of the file,
based on the flag, identify whether mapping information of a specific region is stored in the volatile memory in mapping information for mapping of logical addresses and physical addresses for the non-volatile memory of the storage, the mapping information of the specific region comprising a logical address of the data,
in response to identifying that the mapping information of the specific region is stored in the volatile memory, acquire a physical address of the non-volatile memory mapped to the logical address of the data, and
transmit, to the storage, the request comprising the physical address of the non-volatile memory.

2. The electronic device of claim 1, wherein the designated information table comprises at least one of a designated application information table, a designated file extension information table, or a designated file name information table.

3. The electronic device of claim 2, wherein the processor is further configured to:
based on a first file list or application list relating to a recent frequency of use or a second file list or application list relating to a highest frequency of use, update the designated information table.

4. The electronic device of claim 1, wherein the processor is further configured to:
in response to identifying that the mapping information of the specific region is not stored in the volatile memory, transmit, to the storage, the request comprising the logical address of the data.

5. The electronic device of claim 4, wherein the processor is further configured to:
transmit, to the storage, a request to update the mapping information of the specific region stored in the volatile memory,
receive, from the storage, the mapping information of the specific region, and
store the mapping information of the specific region in the volatile memory.

6. The electronic device of claim 5, wherein the processor is further configured to:
in response to completing a processing of the request for data, transmit, to the storage, the request to update the mapping information of the specific region stored in the volatile memory.

7. The electronic device of claim 5, wherein the processor is further configured to:
in response to no request for data being currently processed, transmit, to the storage, the request to update the mapping information of the specific region stored in the volatile memory.

8. The electronic device of claim 1, wherein the processor is further configured to:
in response to the request for data being a request for writing data, transmit, to the storage, a request for updating the mapping information of the specific region stored in the volatile memory,
receive, from the storage, the mapping information of the specific region, and
update the mapping information of the specific region stored in the volatile memory.

9. A method of an electronic device including a storage comprising a non-volatile memory, the method comprising:
providing, using a display of the electronic device, a screen comprising an icon of a specific application, a name of the specific application, and an icon menu for selecting configuration information on the specific application;
receiving, via a user interface of the screen, the configuration information on the specific application;
based on the configuration information on the specific application, updating a designated information table;
in response to identifying a generation of a request for data included in a file, identifying information of the file and a type of the request;
based on the identifying of the information of the file, identifying whether the information of the file corresponds to a process identifier (ID) and an application name listed in a list of the designated information table of a volatile memory;
in response to identifying that the information of the file corresponds to the process ID and the application name in the list of the designated information table, configuring a flag for the request based on the information of the file;
based on the flag, identify whether mapping information of a specific region is stored in the volatile memory in mapping information for mapping of logical addresses and physical addresses for the non-volatile memory of the storage, the mapping information of the specific region comprising a logical address of the data;
in response to identifying that the mapping information of the specific region is stored in the volatile memory, acquiring a physical address of the non-volatile memory mapped to the logical address of the data; and
transmitting, to the storage, the request comprising the physical address of the non-volatile memory.

10. The method of claim 9, wherein the designated information table comprises at least one of a designated application information table, a designated file extension information table, or a designated file name information table.

11. The method of claim 10, further comprising:
based on a first file list or application list relating to a recent frequency of use or a second file list or application list relating to a highest frequency of use, updating the designated information table.

12. The method of claim 9, further comprising:
in response to identifying that the mapping information of the specific region is not stored in the volatile memory, transmitting, to the storage, the request comprising the logical address of the data.

13. The method of claim 12, further comprising:
transmitting, to the storage, a request to update the mapping information of the specific region stored in the volatile memory;
receiving, from the storage, the mapping information of the specific region; and
storing the mapping information of the specific region in the volatile memory.

14. The method of claim 13, further comprising:
in response to completing a processing of the request for data, transmitting, to the storage, the request to update the mapping information of the specific region stored in the volatile memory.

15. The method of claim 13, further comprising:
in response to no request for data being currently processed, transmitting, to the storage, the request to update the mapping information of the specific region stored in the volatile memory.

16. The method of claim 9, further comprising:
in response to the request for data being a request for writing data, transmitting, to the storage, a request for updating the mapping information of the specific region stored in the volatile memory to the storage;
receiving, from the storage, the mapping information of the specific region; and
updating the mapping information of the specific region stored in the volatile memory.

17. The electronic device of claim 2, wherein the processor is further configured to:
based on one of a first list relating to a recent frequency of use or a second list relating to a highest frequency of use, store file information in the designated information table.

18. The electronic device of claim 1,
wherein the mapping information for mapping of the logical addresses and the physical addresses for the non-volatile memory of the storage is included in the volatile memory, and
wherein the designated information table is included in a file system included in the processor.

19. The electronic device of claim 1,
wherein the designated information table includes application and file information designated according to a user's selection, and
wherein the icon menu for selecting the configuration information on the specific application includes a toggle switch.

* * * * *